United States Patent
Ueno et al.

(10) Patent No.: US 7,260,511 B2
(45) Date of Patent: Aug. 21, 2007

(54) DESIGN AID APPARATUS AND DESIGN EVALUATION METHOD FOR ELECTRONIC DEVICE

(75) Inventors: Osamu Ueno, Ashigarakami-gun (JP); Hitoshi Arakaki, Isehara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 691 days.

(21) Appl. No.: 10/358,333

(22) Filed: Feb. 5, 2003

(65) Prior Publication Data

US 2003/0212537 A1 Nov. 13, 2003

(30) Foreign Application Priority Data

May 7, 2002 (JP) .............................. 2002-131292

(51) Int. Cl.
*G06F 17/10* (2006.01)

(52) U.S. Cl. .............................. 703/2; 703/13; 703/14; 702/57; 702/64; 702/127; 716/3; 716/9; 716/10

(58) Field of Classification Search .................. 703/13, 703/14, 21, 2; 716/9, 3–10; 324/750; 702/64
See application file for complete search history.

(56) References Cited

U.S. PATENT DOCUMENTS

| | | | | |
|---|---|---|---|---|
| 5,552,715 A | * | 9/1996 | Rogers ........................ | 324/627 |
| 5,621,649 A | * | 4/1997 | Iwata et al. .................... | 702/64 |
| 5,812,434 A | * | 9/1998 | Nagase et al. ................. | 703/2 |
| 6,300,779 B1 | * | 10/2001 | Tamaki et al. ............... | 324/750 |
| 6,377,041 B1 | * | 4/2002 | Jones et al. .................. | 324/244 |
| 6,604,225 B1 | * | 8/2003 | Otsu et al. ...................... | 716/3 |
| 6,661,243 B2 | * | 12/2003 | Tamaki et al. .............. | 324/750 |
| 6,834,380 B2 | * | 12/2004 | Khazei ........................ | 716/10 |
| 2002/0039030 A1 | * | 4/2002 | Khazei ........................ | 324/750 |
| 2002/0040466 A1 | * | 4/2002 | Khazei .......................... | 716/9 |
| 2002/0095304 A1 | * | 7/2002 | Khazei ............................ | 705/1 |
| 2003/0212537 A1 | * | 11/2003 | Ueno et al. .................. | 703/14 |

FOREIGN PATENT DOCUMENTS

JP    A 7-302278    11/1995

OTHER PUBLICATIONS

"FLOMERICS Further Enhances Productivity of EMC Design Engineers with FLO/EMC Version 1.2", Flowmerics Inc. May 2002.*

(Continued)

*Primary Examiner*—Fred Ferris
(74) *Attorney, Agent, or Firm*—Oliff & Berridge, PLC

(57) ABSTRACT

A design aid apparatus includes an input section, an antenna propensity determination section, an output section, and a memory storing design data for a plurality of structures comprising an electronic device to be designed. Conductivity of a structure is determined based on conductivity information of the structure read out from the memory. The antenna propensity determination section determines a contact relation, which expresses a state of electrical contact between a conductive structure having conductivity and another conductive structure, based on information relating to shapes and arrangements of structures stored in the memory. A length of a route between a reference conductive structure and the conductive structure is determined. The antenna propensity of the electronic device is evaluated based on the route length.

20 Claims, 20 Drawing Sheets

OTHER PUBLICATIONS

"Integrating Electromagnetic and Thermal Design", Flowmerics Inc., Mar. 2001.*

"Flo/EMC: Shielding Effectiveness of a Box with a Board", De Smedt, Design-Class Analysis for Electromagnetic Compatibility, Jun. 2002.*

Computer Simulation for System Level EMC Design, German, IEEE EMC Society, Oct. 2002.*

"Optimizing of TLM Schemes Based on the General Symmetrical Condensed Node", Trenkic et al, IEEE Transactions on Antennas, vol. 45, No. 3, Mar. 1997.*

"Multiphysics Modeling for Electronic Design", Parry et al, 2000 International Conference on Therm. Phen., IEEE 2000.*

A Fully Integrated Multiconductor Model for TLM, Wlodarczyk et al, IEEE Transactions on Microwave Theory, vol. 46, No. 12, Dec. 1998.*

"Modeling of Arbitrary Slot Structures Using Transmission Line Matrix (TLM) Method", Trenkic et al, Flowmerics 1999.*

"Chairman's Statement", Mann, Flomerics Group PLC, Feb. 23, 2001.*

* cited by examiner

FIG.6

| STRUCTURE NAME | CONDUCTIVITY | COORDINATE DATA |
|---|---|---|
| a | PRESENT | Pa1(x, y), Pa2(x, y), ... |
| b | PRESENT | Pb1(x, y), Pb2(x, y), ... |
| c | PRESENT | Pc1(x, y), Pc2(x, y), ... |
| ... | ... | ... |

FIG.7

|   | a | b | c | d | e | f | g | h | i | j |
|---|---|---|---|---|---|---|---|---|---|---|
| a |   | 1 | 0 | 0 | 0 | 0 | 0 | 0 | 0 | 0 |
| b | 1 |   | 1 | 0 | 0 | 0 | 0 | 0 | 0 | 0 |
| c | 0 | 1 |   | 1 | 1 | 1 | 1 | 0 | 0 | 0 |
| d | 0 | 0 | 1 |   | 0 | 0 | 0 | 1 | 0 | 0 |
| e | 0 | 0 | 1 | 0 |   | 0 | 0 | 1 | 0 | 0 |
| f | 0 | 0 | 1 | 0 | 0 |   | 0 | 1 | 0 | 0 |
| g | 0 | 0 | 1 | 0 | 0 | 0 |   | 1 | 0 | 0 |
| h | 0 | 0 | 0 | 1 | 1 | 1 | 1 |   | 1 | 0 |
| i | 0 | 0 | 0 | 0 | 0 | 0 | 0 | 1 |   | 0 |
| j | 0 | 0 | 0 | 0 | 0 | 0 | 0 | 0 | 0 |   | a-h:STRUCTURE NAMES    1:CONDUCTION PRESENT    0:CONDUCTION ABSENT

FIG.10

| | a | b | c | d | e | f | g | h | i | j | ROUTE LENGTH N | CONDUCTION TO REFERENCE |
|---|---|---|---|---|---|---|---|---|---|---|---|---|
| a | | 1 | 0 | 0 | 0 | 0 | 0 | 0 | 0 | 0 | 1 | PRESENT (SHORT ROUTE) |
| b | 1 | | 1 | 0 | 0 | 0 | 0 | 0 | 0 | 0 | 2 | PRESENT (SHORT ROUTE) |
| c | 0 | 1 | | 1 | 1 | 1 | 1 | 0 | 0 | 0 | 3 | PRESENT (SHORT ROUTE) |
| d | 0 | 0 | 1 | | 0 | 0 | 0 | 1 | 0 | 0 | 4 | PRESENT (SHORT ROUTE) |
| e | 0 | 0 | 1 | 0 | | 0 | 0 | 1 | 0 | 0 | 4 | PRESENT (SHORT ROUTE) |
| f | 0 | 0 | 1 | 0 | 0 | | 0 | 1 | 0 | 0 | 4 | PRESENT (SHORT ROUTE) |
| g | 0 | 0 | 1 | 0 | 0 | 0 | | 1 | 0 | 0 | 4 | PRESENT (SHORT ROUTE) |
| h | 0 | 0 | 0 | 1 | 1 | 1 | 1 | | 1 | 0 | 5 | PRESENT (LONG ROUTE) |
| i | 0 | 0 | 0 | 0 | 0 | 0 | 0 | 1 | | 0 | 6 | PRESENT (LONG ROUTE) |
| j | 0 | 0 | 0 | 0 | 0 | 0 | 0 | 0 | 0 | | 0 | ABSENT | a-h: STRUCTURE NAMES  1: CONDUCTION PRESENT  0: CONDUCTION ABSENT

REFERENCE ↑ (column a)

DESIGN AID APPARATUS AND DESIGN EVALUATION METHOD FOR ELECTRONIC DEVICE

BACKGROUND OF THE INVENTION

1. Field of the Invention

The present invention relates to a design aid apparatus and a design evaluation method for an electronic device, and in particular to a design aid apparatus and a design evaluation method relating to electromagnetic wave radiation properties of an electronic device such as a printer or a fax machine.

2. Description of the Related Art

In recent electric and electronic devices, the technological difficulty of EMC (Electromagnetic Compatibility) design, which prevents generation of unnecessary electromagnetic wave noise and ensures resistance to external noise, has been increasing as sources of electromagnetic waves have increased with the digitalization and increased speed of electronic circuits and as external noise from cellular phones and the like has increased.

In order to efficiently carry out the EMC design of an apparatus, a design of the whole apparatus, especially a design of the grounding system, is important.

Conventionally, as a technique for effecting the design of the whole apparatus, numerical simulation techniques for calculating the electromagnetic field, such as the moment method described in, for example, Japanese Patent Application Laid-Open (JP-A) No. 7-302278, are known.

FIG. 20 shows a functional block diagram of a simulation apparatus using the conventional moment method. This simulation apparatus includes: a database 70 of three-dimensional CAD data, library data, or the like; an input unit 72 for converting CAD data of an electric circuit apparatus to be analyzed, which CAD data is input from the database 70, into structure information required to calculate an electromagnetic field strength, and then inputting the converted data into an electromagnetic field strength calculation unit 74; the electromagnetic field strength calculation unit 74 for calculating the electromagnetic field strength according to the input data; and an output unit 76 for outputting an obtained result.

In this simulation apparatus, structures of printed circuit boards, cables, leads, casings, and the like included in the electric circuit apparatus to be analyzed are input accurately, and consequently an electromagnetic field strength can be calculated with high precision.

In the above described conventional technique, in principle, simulation of an actual apparatus can be conducted with high precision. In actual practice, however, the electromagnetic field calculation unit needs a very long calculation time and a lot of memory space. Therefore, structures in the apparatus can be calculated only in considerably simplified models. This results in a problem that the conventional technique cannot be substantially utilized for the apparatus design.

SUMMARY OF THE INVENTION

In order to solve the above described problems, the present invention has been made. It is an object of the invention to provide a design aid apparatus capable of determining whether electromagnetic radiation will easily occurs in a structure, without increasing the burden of calculation even for electric and electronic apparatuses having a complicated structure.

According to a first aspect of the invention for achieving the object, there is provided a design aid apparatus to be used for designing an electronic device, which includes a plurality of structures and a previously specified reference conductive structure among the plurality of structures, the design aid apparatus comprising: a storage unit for storing (a) information relating to shapes and arrangements of the respective structures and (b) conductivity information relating to conductivities of the respective structures; an evaluation unit for evaluating an electromagnetic wave radiation property of the electronic device; and an output unit for outputting a result of the evaluation performed by the evaluation unit, wherein the evaluation unit includes: a conductivity decision unit for determining a conductivity for each structure on the basis of the conductivity information, a contact relation determination unit for determining, based on the information relating to shapes and arrangements of the respective structures, a contact relation, which expresses a state of one of electrical contact and electrical non-contact, between at least one conductive structure and another conductive structure, the at least one conductive structure and the other conductive structure being selected from among the plurality of structures and determined to have conductivity, and a route decision unit for determining, on the basis of the contact relation, a route length between the reference conductive structure and the at least one conductive structure, and the evaluation unit for evaluating the electromagnetic wave radiation property of the electronic device as an antenna propensity on the basis of the route length.

The information relating to shapes and arrangements includes coordinate information. The reference conductive structure is typically a structure electrically connected to a grounding terminal of the electronic device. The conductivity information includes information relating to at least one of a material, surface treatment, and conductivity, of the respective structures.

The route length can be determined on the basis of a number of conductive structures that exist on a route between the reference conductive structure and the at least one conductive structure.

The route decision unit further can calculate the route length between any two conductive structures on the basis of the contact relation. The route length can be determined on the basis of a number of conductive structures that exist on a route between two conductive structures, which have been determined to be in a contact relation.

According to the first aspect of the invention, the storage unit stores design information of a plurality of structures included in the electronic device. The design information includes coordinate information relating to shapes and arrangements of the structures and conductivity information relating to conductivities of the structures, such as information relating to material qualities and whether there are conductivities.

The conductivity decision unit evaluates and makes a decision as to whether each of a plurality of structures has conductivity, on the basis of the conductivity information included in the design information.

The contact relation decision unit evaluates and makes a decision as to a contact relation representing an electric contact or non-contact state between at least one conductive structure and another conductive structure, which are determined to have conductivity among the structures on the basis of the coordinate information included in the design information. In other words, the contact relation decision unit makes a decision as to whether every conductive structure is in contact with another conductive structure.

The route decision unit makes a decision on each of contact routes between a reference conductive structure previously specified among the conductive structures and other conductive structures other than the reference conductive structure on the basis or the contact relation. The route subjected to the decision includes a route that leads to conductive structures in electrically non-contact state, i.e., electrically interrupted route. In other words, the route decision unit evaluates and makes a decision as to whether each structure has conduction to the reference conductive structure, and in the case of conduction, how many other conductive structures exist between the structure and the reference conductive structure.

The route evaluation unit makes a decision as to the antenna propensity that represents an electromagnetic wave radiation property of the electronic device, on the basis of the contact route. For example, it is possible to use the number of conductive structures from the reference conductive structure to the other conductive structure as the route length and use the route length as the antenna propensity and an evaluation value for evaluating the electromagnetic wave radiation property. And for example, when the route length is at least a predetermined value, the route from the reference conductive structure is long and the antenna propensity is determined to be high, whereas when the route length is less than the predetermined value, the route from the reference conductive structure is short and the antenna propensity is determined to be low.

The output unit outputs a result of the evaluation (decision) performed by the evaluation unit. For example, the output unit displays an image that represents shapes and an arrangement of structures on a display or the like. In addition, a specific display such as a hatched display is performed so as to make structures, which have a high antenna propensity, conspicuous. As a result, the designer can easily discriminate structures, which have a high antenna propensity and structures each having a low antenna propensity. It is also possible to use a derived route length or a value computed according to a predetermined equation as an evaluation value that represents the antenna propensity and output the evaluation value. As a result, not only the binary evaluation, i.e., whether the antenna propensity is high or low, but also a multi-valued evaluation can be performed.

In this way, the antenna propensity is determined on the basis of the contact route. Even if the apparatus includes complicated structures, therefore, the antenna propensity can be evaluated with a comparatively simple calculation.

Even if the route length from the reference conductive structure to the other structure is short, the antenna propensity becomes high and electromagnetic wave radiation becomes apt to occur in the case where the contact route between structures has a long length and the structures have a short distance therebetween and a large opposing area.

Therefore, the evaluation unit may calculate a distance between any two structures each having a route length that is at least a predetermined length (one of the structures may be a reference conductive structure), and when the distance is less than a predetermined value, the evaluation unit may calculates an area of opposing portions of the two structures, and adjusts an evaluation result on the basis of the area.

In other words, the evaluation unit may include a distance calculation unit for calculating on the basis of the coordinate information, a distance between structures, which have a route length of at least a predetermined length therebetween, and an area calculation unit for calculating an area of opposing portions of the plurality of structures when the distance is less than a predetermined distance, and the evaluation unit may adjust the evaluation (decision) result on the basis of the area.

The evaluation unit includes a distance calculation unit and an area calculation unit. The distance calculation unit calculates a distance between structures, which have a route length therebetween that is at least a predetermined length, on the basis of the coordinate information.

When the distance calculated by the distance calculation unit is less than a predetermined distance, the area calculation unit calculates an area of opposing portions of a plurality of structures.

The evaluation unit adjusts the evaluation (decision) result on the basis of the area of opposing portions. For example, if the area of opposing portions is at least the predetermined value, the evaluation unit determines the antenna propensity to be high. Even if the route from the reference conductive structure to any one of the structures is short, the antenna propensity is determined to be high in the case where the contact route between structures has a long length and the structures have a short distance therebetween and a large opposing area.

In the case where contact portions at which conductive structures contact each other have a great area or length or the number of contact portions is large, the antenna propensity is considered to be decreased.

The contact relation decision unit may calculate, for two conductive structures that are in contact with each other, at least one of an area of a contact portion, a length of a contact portion, and a number of contact portions, and the evaluation unit may adjust the evaluation result on the basis of a result of said at least one calculation.

The contact relation decision unit may include a detection unit for detecting at least one among an area of contact portions of two conductive structures that are in contact with each other, a length of the contact portions of the two conductive structures, and number of contact portions, and the evaluation unit may adjust the evaluation (decision) result on the basis of a detection result of the detection unit. For example, in the case where the area of contact portions of conductive structures in contact with each other is larger than a predetermined area, the case where the length of contact portions is longer than a predetermined length, or the case where the number of contact portions is larger than a predetermined number, the evaluation unit adjusts the evaluation (decision) result by decreasing the evaluation value representing the antenna propensity by a predetermined value so as to lower the antenna propensity. As a result, the antenna propensity can be evaluated with higher precision.

The evaluation unit further includes a shape decision unit, the shape decision unit calculates a length of a conductive structure on the basis of coordinate information, and the evaluation unit adjusts the evaluation result on the basis of the length of the conductive structure. In addition, the shape decision unit may calculate a length and a width of a conductive structure on the basis of coordinate information, and the evaluation unit may adjust the evaluation result on the basis of a ratio between the length and the width of the conductive structure.

In other words, the evaluation unit may further include a length detection unit for detecting the length of the conductive structure on the basis of the coordinate information, and the evaluation unit may adjust the evaluation (decision) result on the basis of the length of the conductive structure.

For example, it is determined whether the conductive structure has a slender shape by detecting the length. On the basis of the length, the evaluation (decision) result is adjusted. For example, as the length becomes longer, the antenna propensity is determined to become even higher. By thus deciding the antenna propensity considering the length of the conductive structure as well, the antenna propensity can be evaluated with high precision.

Furthermore, for example, it is also possible to detect the shape itself of the conductive structure, determine whether the shape is a common mode shape, such as a dipole shape or a monopole shape, and adjust the evaluation (decision) result on the basis of a result of the detection.

For a conductive structure having a length that is at least equal to a predetermined value and at least one end in contact with another conductive structure, the evaluation unit can also calculate an area of a contact portion at said at least one end, and adjusts the evaluation result on the basis of the area.

For a conductive structure that is at least equal in length to a predetermined value, the evaluation unit may calculate an area of a contact side of each of other conductive structures that are in contact with ends of the conductive structure, and adjust the evaluation (decision) result on the basis of the area of the contact side.

In other words, even if the length of the conductive structure is equal to at least a predetermined value and its antenna propensity would otherwise be determined to be high, the antenna propensity becomes low in the case where the conductive structure is, at one end or both ends thereof, in contact with another conductive structure and the area of the contact side of the contacting conductive structure is large.

In the case where the area of the contact side is larger than a predetermined value, therefore, the evaluation unit adjusts the evaluation (decision) result by decreasing the evaluation value representing the antenna propensity by a predetermined value so as to lower the antenna propensity. As a result, the antenna propensity can be evaluated with higher precision.

According to a second aspect of the invention, there is provided a method for evaluating an electromagnetic wave radiation property of an electronic device, the electronic device including a plurality of structures and a previously specified reference conductive structure among the plurality of structures, the evaluation method comprising the steps of: providing (a) information relating to shapes and arrangements of the respective structures and (b) conductivity information relating to conductivities of respective structures; determining conductivities of the respective structures on the basis of the conductivity information; determining, based on the information relating to shapes and arrangements of the respective structures, a contact relation, which expresses a state of one of electrical contact and electrical non-contact, between at least one conductive structure and another conductive structure, the at least one conductive structure and the other conductive structure being selected from among the plurality of structures and determined to have conductivity; determining, based on the contact relation, a route length between the reference conductive structure and the at least one conductive structure; and evaluating the antenna propensity of the electronic device on the basis of the route length.

BRIEF DESCRIPTION OF THE DRAWINGS

FIG. 6 is a diagram showing a configuration of conductivity table data.

FIG. 7 is a diagram showing a configuration of contact table data.

FIG. 10 is a diagram showing a configuration example of data in a conduction table.

DESCRIPTION OF THE PREFERRED EMBODIMENTS

Hereafter, embodiments of the present invention will be described in detail with reference to the drawings.

Figure 1:
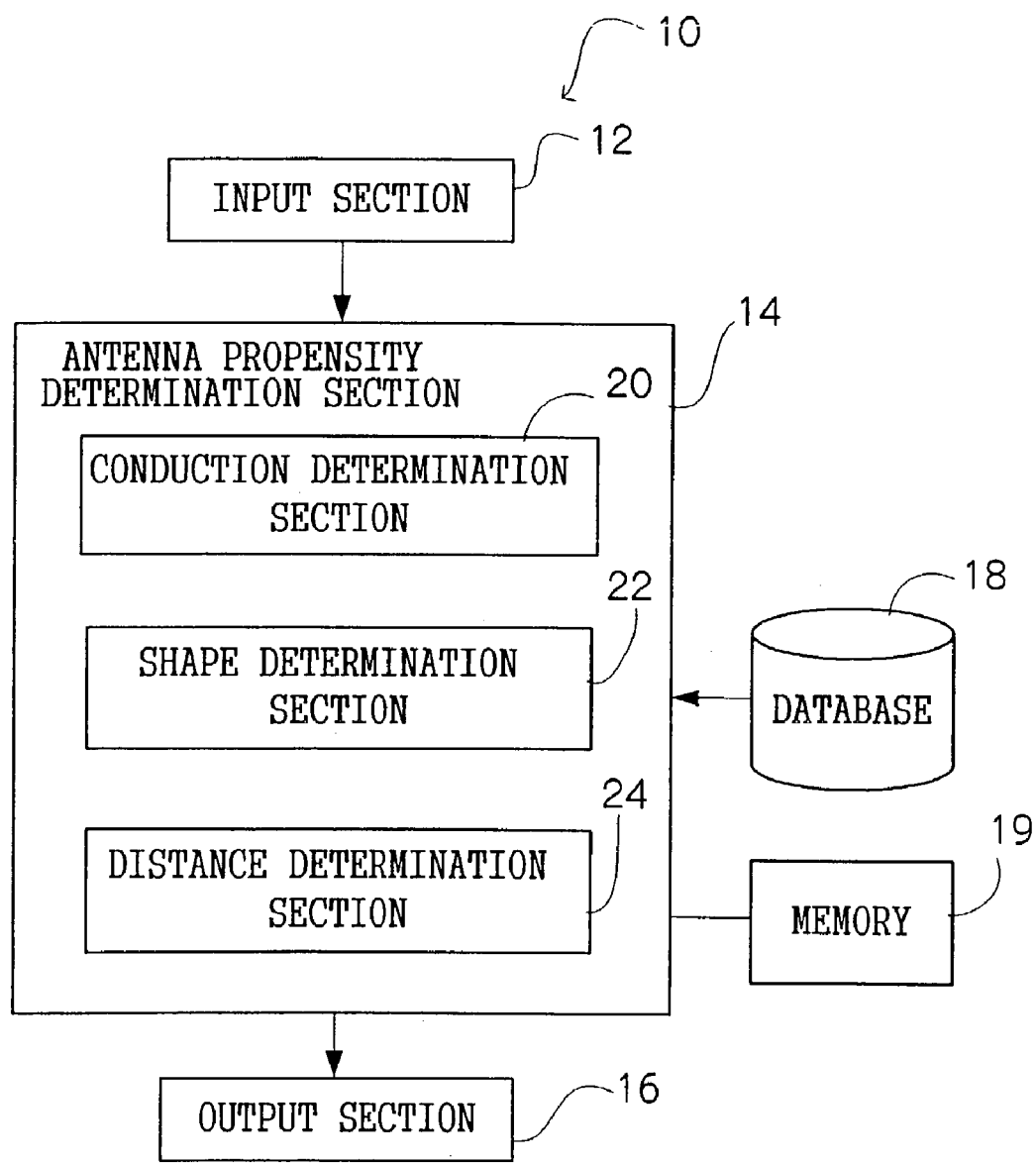
FIG. 1 is a schematic configuration diagram of a design aid apparatus.

FIG. 1 shows a function block diagram of a design aid apparatus 10 according to the invention. The design aid apparatus 10 determines whether an electronic device such as a printer or a facsimile has a structure that is apt to generate electromagnetic wave noise, i.e., whether it has a structure having such a property as to function as an antenna, which will radiates electromagnetic wave noise.

The design aid apparatus 10 includes an input section 12 for performing various kinds of inputting such as inputting a decision start order, an antenna propensity determination section 14 for making a decision as to the antenna propensity of the apparatus, an output section 16 for outputting a result of evaluation executed by the antenna propensity determination section 14, a database 18 storing design data of a plurality of structures that form an apparatus of a decision subject, and a memory 19 for storing various kinds of data.

The input section 12 is provided to select a subject apparatus to which the determination will be applied, initiate the determination, set a reference structure which will initiate the determination, input decision conditions, such as whether a default value or a specific value will be used as a decision condition, input designation of an output method for outputting a result of evaluation (decision), and input auxiliary data required for the decision.

The antenna propensity determination section 14 determines the antenna propensity of each structure forming the subject apparatus on the basis of input information input by the input section 12 and design data stored in the database 18.

The antenna propensity determination section 14 includes a conduction determination section 20 for determining conduction between each structure and the reference structure specified by the input section 12, a shape determination section 22 for determining whether each structure has a shape such that the structure is apt to function as an antenna, and a distance determination section 24 for determining a distance between structures. It is desirable to utilize all of the three determination sections and make a synthetic judgment. However, the determination of the antenna propensity does not necessarily need all of the three determination sections.

Figure 2:
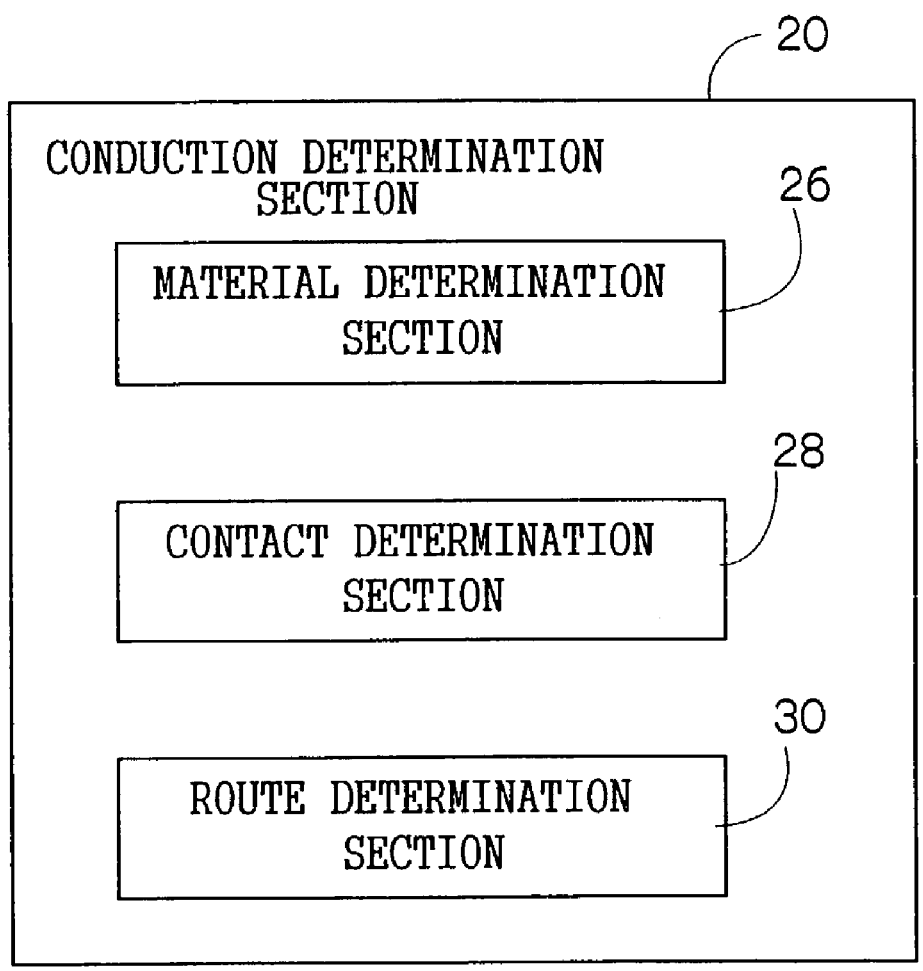
FIG. 2 is a schematic configuration diagram of a conduction determination section.

For example, as shown in FIG. 2, the conduction determination section 20 includes a material quality determination section 26 for determining whether each structure is formed of a conductive material, a contact determination section 28 for determining whether each structure is in contact with an adjacent structure, and a route determination section 30 for determining whether there is conduction from each structure to the reference structure, and determining a length between each structure and the reference structure.

These determination sections may make a decision individually. In addition, considering physical characteristics such as a series connection of different structures increasing impedance at high frequencies and a parallel connection of different structures decreasing impedance at high frequencies, a conduction decision can be made by making a synthetic judgment on results from respective determination sections.

The material quality determination section 26 acquires at least one of material quality information, surface processing information, and conductivity data from the database 18, and makes a binary decision as to whether the material quality is conductive or nonconductive or makes a multi-valued decision including whether the conductivity is large or small, according to predetermined decision criteria.

The contact determination section 28 makes a binary decision as to whether there is contact. However, the contact determination section 28 may make a multi-valued decision on contact by taking the magnitude of impedance at high frequency into consideration. Regarding the decision as to whether there is contact between structures, all conventionally known contact decision techniques can be utilized. For example, it is possible to calculate a distance d between two structures and determine that the two structures are in contact with each other when the distance d is no more than 0 or a predetermined calculation error.

There are various methods to make a multi-valued decision considering the magnitude of impedance at high frequency. For example, determining that the contact is better the more the number of points of contact increases; calculating a contact area S and a length L of a contact portion and determining that the contact is better the more the contact area S and the length L of the contact portion increase; determining contact according to a contact technique used, such as pressing, screwing, welding, or soldering.

The route determination section 30 makes a binary decision i.e., (there is conduction or there is no conduction) to determine whether there is conduction between a subject structure and the reference structure by determining whether there is conduction to the reference structure and whether the structure is in a class near the reference structure or in a class away from the reference structure (whether the number of structures existing between the reference structure and the structure is small or large). Alternatively, a multi-valued decision may also be made. For example, a contact decision is executed between all structures determined to be conductive in material quality, and on the basis of table data resulting from this evaluation (decision), conducting routes existing between a structure serving as the reference and the subject structure are clarified. When there are no conducting routes even when all routes are examined, the structure is determined to have no conduction to the reference structure. If there is conduction to the reference structure, then in addition to a binary decision that there is conduction, a multi-valued decision may be made considering the number of structures existing between the reference structure and the subject structure, and results of decisions made by other determination sections such as the material quality decision, the contact determination section, and the shape determination section.

The shape determination section 22 makes a decision as to whether a structure has such a shape as to be apt to function as an antenna, such as a dipole shape or a monopole shape. Alternatively, the shape determination section 22 may make a binary or multi-valued decision by using a method of comparing a size or a length of a subject structure with a wavelength $\lambda$ converted from an upper limit frequency of a subject electromagnetic wave radiation, or a method of calculating a distance between a contact point and an end of the structure and comparing the distance with the wavelength $\lambda$.

The distance determination section 24 makes a decision as to whether the distance between structures is large or small, and makes a decision in accordance with a predetermined decision criterion. Besides, a decision may be made by combining the magnitude of the distance from each structure and the magnitude of a class according to the route decision.

The output section 16 is formed of, for example, a display, a printer, or a recording device. The output section 16 displays the result of the evaluation (decision) made by the antenna propensity determination section 14 as image data, prints the result on recording paper as a list, or records the result on a recording medium as electronic data.

The database 18 stores design data (CAD data) of a plurality of structures included in an apparatus of a decision subject. By specifying the apparatus, design data of a plurality of structures included in the apparatus are obtained.

The design data (design information) includes, for example, three-dimensional coordinate data (coordinate information) and attribute data. From the design data, shapes, arrangement relations and attributes of respective structures can be known. The attribute data includes, for example, material quality information that represents a material quantity of a structure, information indicating whether conduction processing or insulation processing has been applied on the surface of the structure, and conductivity information such as surface processing information including coordinate data that specifies a region subjected to processing. Instead of the surface processing information, or besides the surface processing information, conductivity information indicating conductivity of a structure may be further included in the attribute data.

The material quality determination section 26 corresponds to a conductivity decision unit of the invention. The contact determination section 28 corresponds to a contact relation decision unit of the invention. The route determination section 30 corresponds to a route decision unit and a part of an evaluation unit. The output section 16 corresponds to an output unit of the invention. The memory 19 corresponds to a storage unit of the invention.

Figure 3:
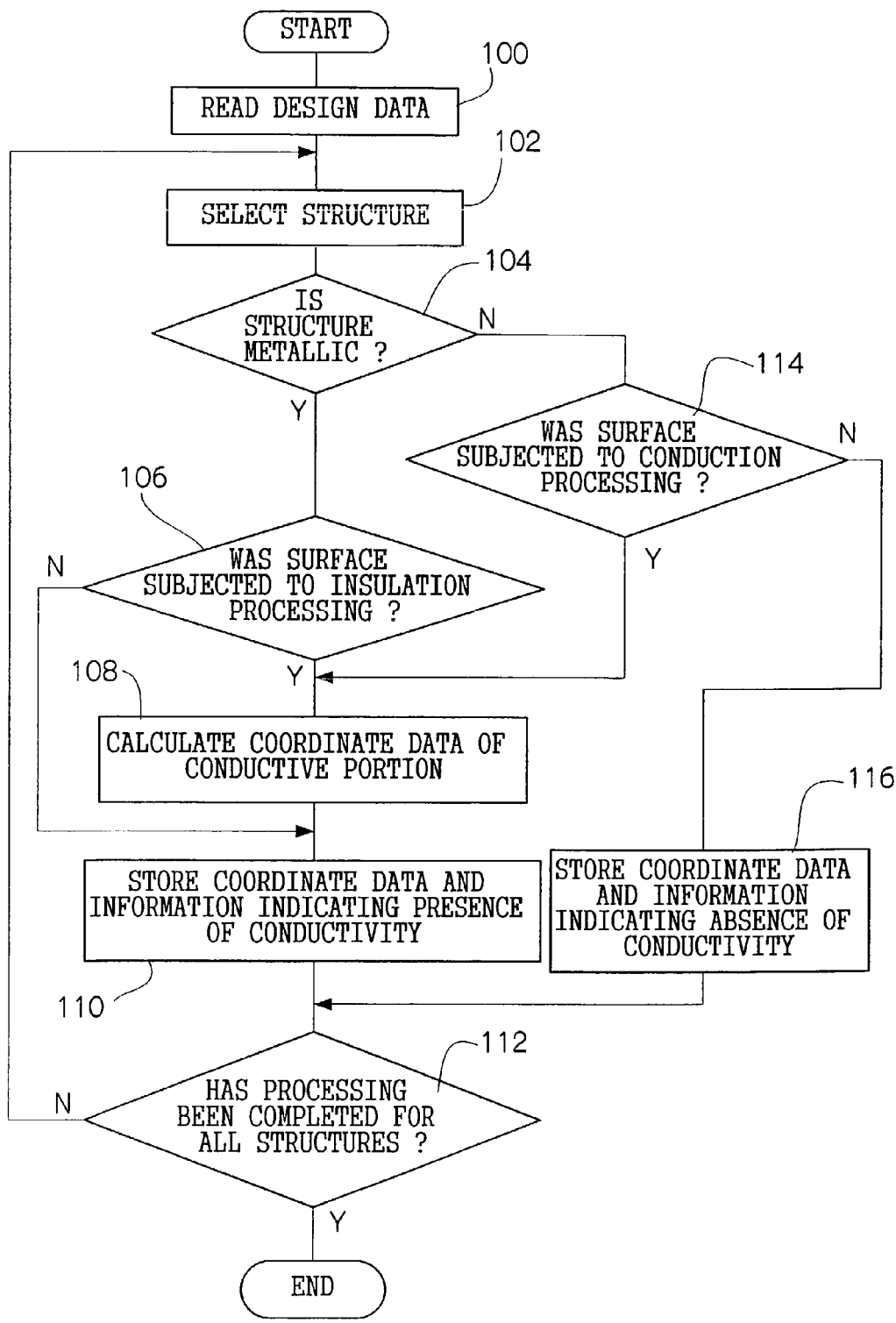
FIG. 3 is a flow chart of a processing routine executed in a material determination section.
Figure 4:
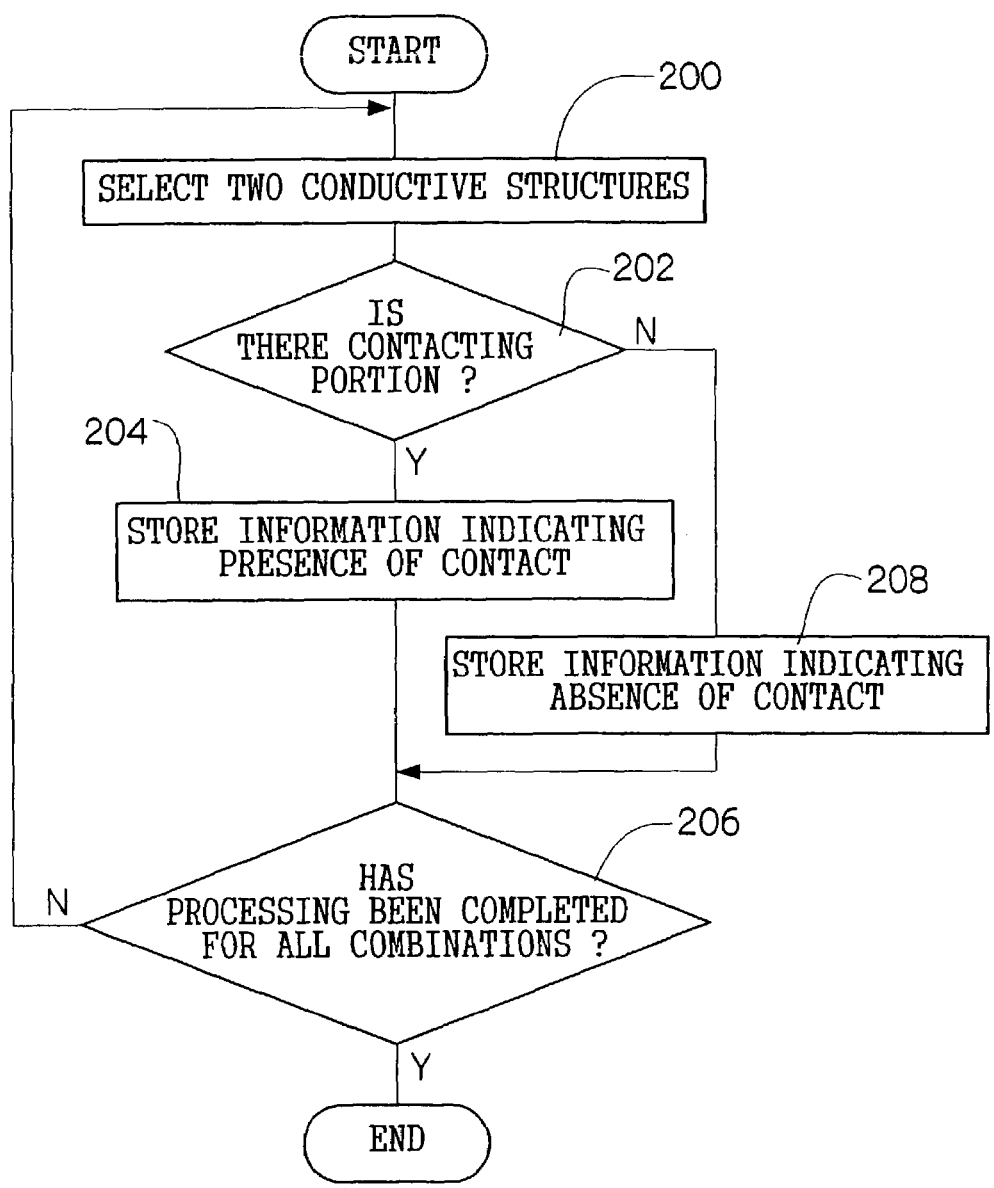
FIG. 4 is a flow chart of a processing routine executed in a contact determination section.
Figure 5:
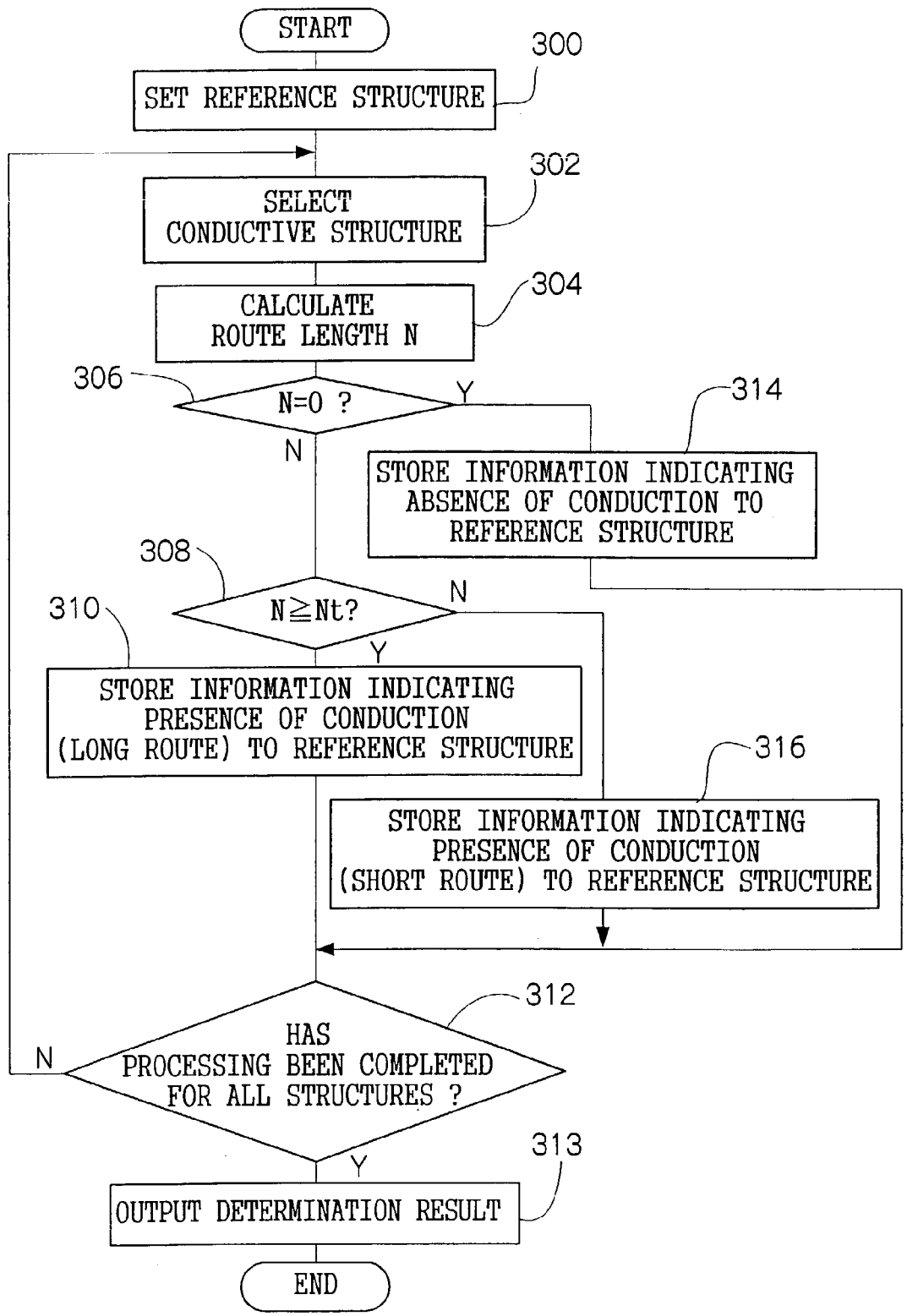
FIG. 5 is a flow chart of a processing routine executed in a path determination section.
Figure 9:
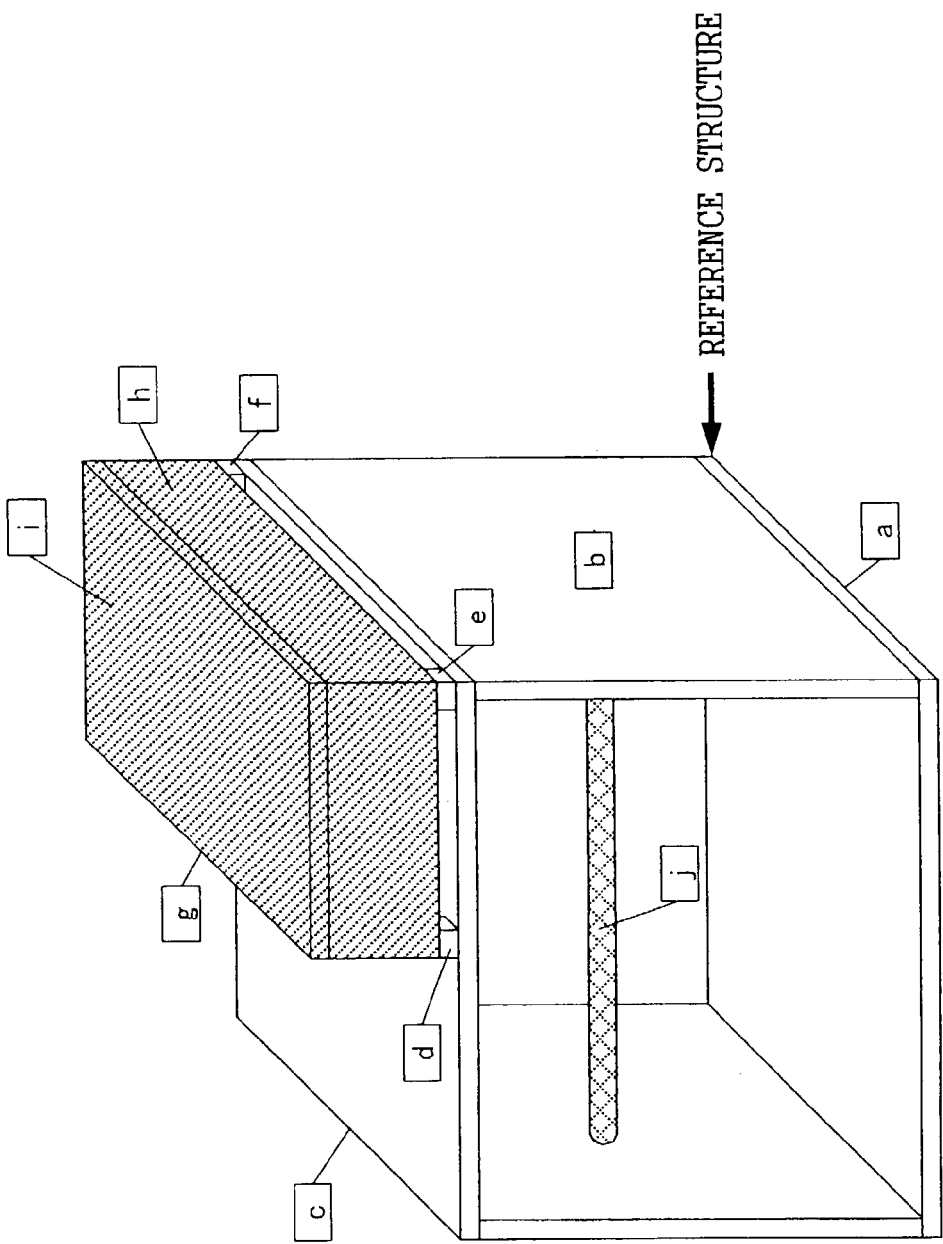
FIG. 9 is a diagram showing an arrangement of structures, which form an apparatus.

Processing executed by the conduction determination section 20 will now be described with reference to flow charts shown in FIGS. 3 to 5. A flow chart shown in FIG. 3 is a flow chart of a processing routine executed by the material quality determination section 26. A flow chart shown in FIG. 4 is a flow chart of a processing routine executed by the contact determination section 28. A flow chart shown in FIG. 5 is a flow chart of a processing routine executed by the route contact determination section 30. The present embodiment will now be described with reference to the case where an apparatus including conductive structures "a" to "h" as shown in FIG. 9 is determined in antenna propensity.

At step 100 shown in FIG. 3, the material quality determination section 26 reads design data respectively of structures included in the apparatus of a decision subject that is input (selected) from the input section 12 by operation of an operator, from the database 18.

Subsequently, at step 102, a sequence selects one structure from among a plurality of structures. At step 104, it is determined on the basis of the material quality information in the attribute data whether the selected structure is formed of a metallic material, i.e., whether the selected structure is conductive.

If the structure is not formed of a metallic material, then the decision at step 104 is negative and the sequence proceeds to step 114. On the other hand, if the structure is formed of a metal material, then the decision at step 104 is affirmative and the sequence proceeds to step 106.

At step 106, it is determined on the basis of surface processing information in the attribute data whether the surface of the structure has been subjected to insulation processing. If the surface of the structure has not been subjected to insulation processing, then the decision at step 106 is negative, and the sequence proceeds to step 110.

On the other hand, if the surface of the structure has been subjected to insulation processing, then the decision at step 106 is affirmative, and the sequence proceeds to step 108.

At step 108, coordinate data of a portion of the structure, which portion excludes a region subjected to insulation processing, i.e., coordinate data of a region having conductivity, are calculated on the basis of design data.

At step 110, the coordinate data of the region having conductivity in the structure and information indicating that the structure is a structure having conductivity are stored in the memory 19. They are stored in the form of conductivity table data, for example, as shown in FIG. 6. In this way, if a surface of a structure is subjected to insulation processing even in the case where the structure itself is a metallic material, then a portion obtained by removing the portion subjected to the insulation processing is handled as a conductive structure.

At step 114, it is determined on the basis of the surface processing information of the attribute data whether the surface of the structure has been subjected to conduction processing. If the surface of the structure has not been subjected to conduction processing, then the decision at step 114 is negative, and the sequence proceeds to step 116, where the coordinate data of the region and information indicating that the structure is a structure having no conductivity are stored in the memory 19 in the form of conductivity table data as shown in FIG. 6.

On the other hand, if the surface of the structure has been subjected to conduction processing, then the decision at step 114 is affirmative, and the sequence proceeds to step 108, where coordinate data of a region subjected to the conduction processing are calculated on the basis of design data. At step 110, the coordinate data of the region having conductivity in the structure and information indicating that the structure is a structure having conductivity are stored in the memory 19 in the form of conductivity table data as shown in FIG. 6. In this way, if a surface of a structure is subjected to conduction processing by gold plating even in the case where the structure itself is not metallic in material quality, then a portion is handled as a conductive structure.

At step 112, it is determined whether the above described decisions have been made for all structures. If the above described decisions have been made for all structures, then the decision at step 112 is affirmative and the routine is finished. On the other hand, if the above described decisions have not been made for all structures, then the decision at step 112 is negative, and the sequence returns to step 102, where a structure that has not been subjected to the above described decisions is selected and similar processing is carried out.

In this way, the decision regarding the material quality, i.e., the decision as to whether there is conductivity, is made for all of the structures comprising the subject apparatus. In the foregoing description, a binary decision as to whether there is conductivity is made on the basis of the surface processing information. However, decision regarding the conductivity may be made on the basis of multi-valued conductivity information. For example, it is possible that the conductivity is determined to be present when the conductivity is at least a predetermined threshold value and the conductivity is determined to be absent when the conductivity is less than the predetermined threshold value.

A processing routine executed by the contact determination section 28 will now be described with reference to the flow chart shown in FIG. 4.

At step 200 shown in FIG. 4, the contact determination section 28 selects two conductive structures from the conductivity table data shown in FIG. 6.

At step 202, it is determined on the basis of the coordinate data of the two selected structures whether a contact portion exists. For the decision as to whether there is contact, a distance d between two structures is derived. If the distance is 0, i.e., if there are portions having identical coordinates, then contact is determined to be present. Otherwise, contact is determined to be absent. Alternatively, contact may be determined to be present when the distance d is equal to or less than a predetermined value at which contact can be determined to be substantially present, and contact may be determined to be absent when the distance d is greater than the predetermined value.

If there is a contact portion, then the decision at step 202 is affirmative and the sequence proceeds to step 204.

At step 204, information indicating that the two selected structures are in contact with each other is stored in the memory 19 in the form of contact table data, for example, as shown in FIG. 7.

On the other hand, if there are no contact portions, then the decision at step 202 is negative and the sequence proceeds to step 208.

At step 208, information indicating that the two selected structures are not in contact with each other is stored in the memory 19 in the form of contact table data as shown in FIG. 7.

At step 206, it is determined whether the above described contact decision has been conducted for all structure combinations. If the above described contact decision has been conducted for all structure combinations, then the decision at step 206 is affirmative, and the routine is finished.

Figure 8:
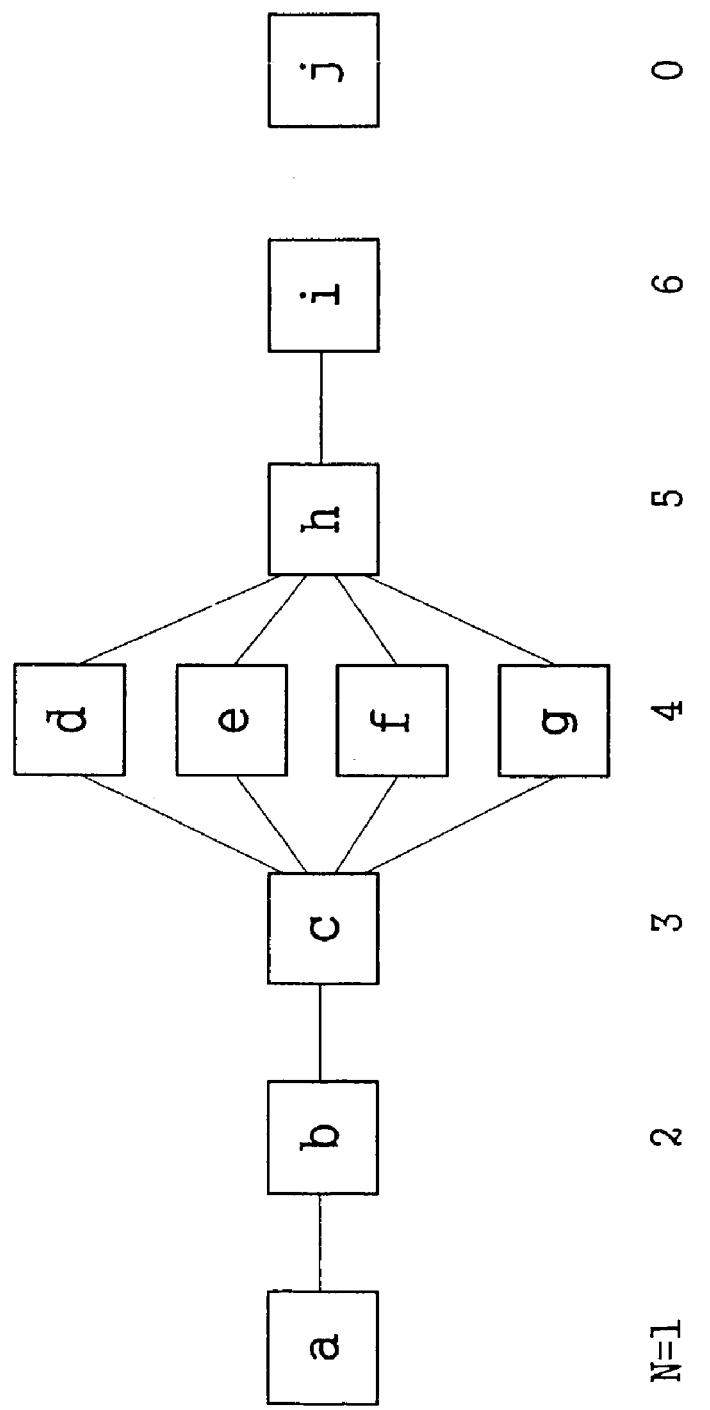
FIG. 8 is a diagram showing an example of a contact state of a structure.

On the other hand, if the above described contact decision has not been conducted for all structure combinations, then the decision at step 206 is negative, and the sequence returns to step 200, where the structures of a combination that has not been selected are selected, and a contact decision is made in the same way as the foregoing description. In this way, the contact decision for all combinations of a plurality of structures is conducted. As a result, it is possible to obtain a contact route of structures as shown in FIG. 8 from contact table data shown in FIG. 7.

In the foregoing description, a decision as to whether there is contact is made in a binary manner. However, a multi-valued decision may be made considering whether the impedance at high frequency is large or small. Specifically, a multi-valued decision may be made by calculating coordinate data of a contacting region and calculating the length and area of the region. For example, it is possible to determine that there is contact when the length or area of the contacting region is at least a predetermined threshold and that there is no contact when the length or area of the contacting region is less than the predetermined threshold. The contact may also be determined considering the number of contact points between two structures and a contact technique used, such as pressing, screwing, or soldering.

A processing routine executed by the route determination section 30 will now be described with reference to the flow chart shown in FIG. 5.

At step 300 shown in FIG. 5, the route determination section 30 sets a reference conductive structure. For example, as shown in FIG. 9, a conductive structure "a" is set as the reference structure. As for the reference structure, for example, a structure connected to GND (ground) is selected.

At step 302, one conductive structure is selected from among a plurality of structures. At a subsequent step 304, a route length N from the structure "a" serving as the reference structure is derived on the basis of the contact route shown in FIG. 8 obtained from the contact table data shown in FIG. 7. The route length N is added to the contact table data shown in FIG. 7 to form conduction table data as shown in FIG. 10.

In the case where there is conduction with the structure "a" serving as the reference structure, the route length N represents that the structure is the Nth structure from the structure "a". If there is no conduction between the structure and the structure "a", the route length N becomes 0. For example, as shown in FIG. 8, the route length N of the structure "b" is 2 and the route length N of the structure "j" is 0.

At step 306, it is determined whether the derived route length N is 0, i.e., whether there is no conduction with the structure "a". If the route length N is 0, i.e., there is no conduction with the structure "a", then the decision at step 306 is affirmative and the sequence proceeds to step 314. On the other hand, if the route length N is not 0, i.e., there is conduction with the structure "a", then the decision at step 306 is negative and the sequence proceeds to step 308.

At step 314, information indicating that there is no conduction with the structure "a" is added to the conduction table data as conductivity to the reference structure as shown in FIG. 10.

At step 308, it is determined whether the route length N is at least a predetermined threshold Nt (for example, 5). If the route length N is at least the predetermined threshold Nt, then the decision at step 308 is affirmative, and the sequence proceeds to step 310. On the other hand, if the route length N is less than the predetermined threshold Nt, then the decision at step 308 is negative, and the sequence proceeds to step 316. The predetermined threshold Nt can be set equal to a value such that, when the route length is at least the value, it will determine that the antenna propensity of the structure is high and a negative effects caused by electromagnetic wave radiation will be severe and, when the route length is less than the value, it will determine that the antenna propensity of the structure is low and a negative effects caused by electromagnetic wave radiation will be slight.

At step 310, information indicating that there is conduction to the structure "a" and the route length is long is added to the conduction table data. In the same way, at step 316, information indicating that there is conduction to the structure "a" and the route length is short is added to the conduction table data as conductivity with the reference structure.

At step 312, it is determined whether the route length N has been calculated for all structures. If the route length N has been calculated for all structures, then the decision at step 312 is affirmative, and the sequence proceeds to step 313. On the other hand, if the route length N has not been calculated for all structures, then the decision at step 312 is negative, and the sequence returns to step 302, where a structure that has not yet been selected is selected and processing similar to that described above is performed.

By thus determining a reference structure, determining whether there is conduction from each structure to the reference structure, deriving a route length N of each structure from the reference structure, and determining whether the route length N is at least the predetermined threshold Nt, it can be determined whether the antenna propensity of the structure is high or low.

At step 313, the evaluation (decision) result is output from the output section 16. For example, on the basis of the conductivity table data and the conduction table data, an image representing the shape of a conductive structure is output to the output section 16 as a result of the decision. As a result, the output section 16 displays images of the conductive structures "a" to "h" as shown in FIG. 9 on a display or the like, or prints the images of the conductive structures "a" to "h" on recording paper. At this time, in order to facilitate discrimination between structures, which have a high antenna propensity, and structures, which have a low antenna propensity, structures having no conduction with the reference structure are indicated by cross hatched regions, and structures each having conduction but having a route N that is at least the predetermined threshold Nt are indicated by hatched regions, whereas other structures are indicated by blanks as shown in FIG. 9. At this time, the contact routes of the structures shown in FIG. 8 may be displayed.

In FIG. 9, the structure "j" is in a state, for example, such that there is no conduction to the structure "a" serving as the reference structure connected to GND, i.e., the structure "j" is a electrically floating relative the structure "a". Since the structure "j" is high in antenna propensity and apt to generate electromagnetic wave radiation, the structure "j" needs careful EMC design. Moreover, the structures "h" and "i" have conduction to the structure "a", but since the route from the structure "a" is long, there is a fear that the structures "h" and "i" will greatly differ in potential from the structure "a". Since the structures "h" and "i" are also high in antenna propensity and apt to generate electromagnetic wave radiation, the structures "h" and "i" need careful EMC design.

Figure 11:
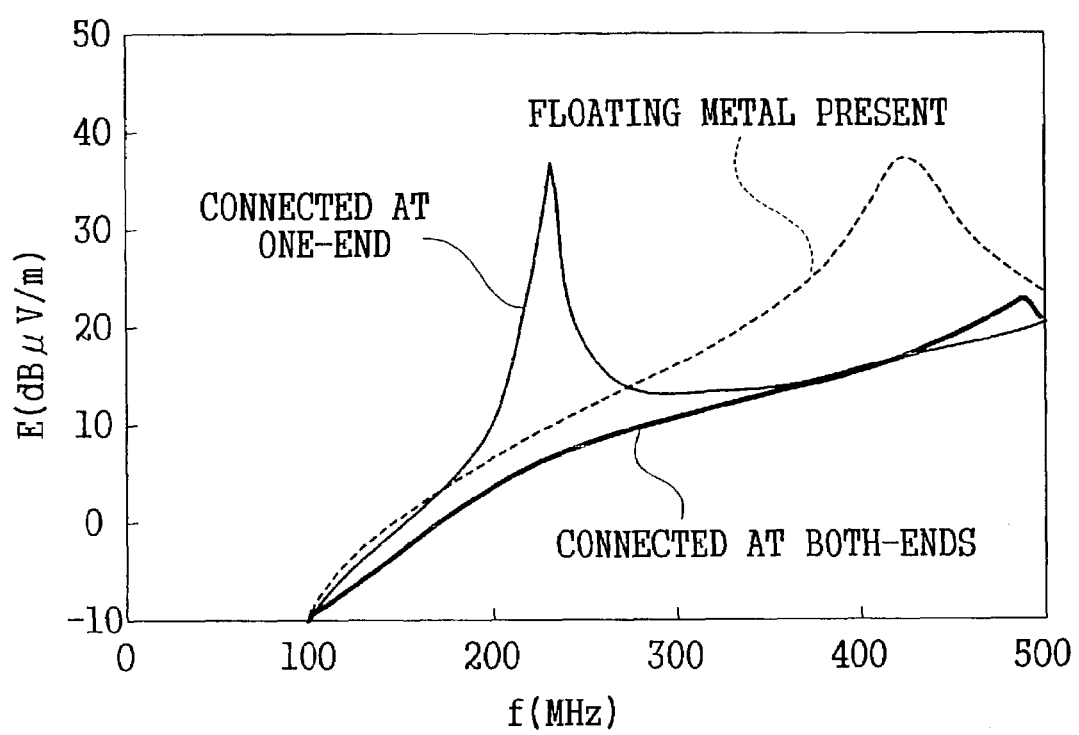
FIG. 11 is a diagram showing a simulation result of a relation between frequency and a level of electromagnetic wave radiation.

In FIG. 11, a simulation result of electromagnetic wave radiation in the case where the structure "j" is floated (isolated) from the reference structure is represented by a broken line, and a simulation result of electromagnetic wave radiation in the case where one end of the structure "j" is conducted to the reference structure is represented by a thin solid line. A simulation result of electromagnetic wave radiation in the case where both ends of the structure "j" are conducted to the reference structure is represented by a thick solid line. FIG. 11 shows that electromagnetic wave radiation is suppressed when both ends of the structure "j" are conducted as compared with a state in which the structure "j" is floated.

By detecting and displaying structures which do not conduct to the reference structure as shown in FIGS. 8 and 9, therefore, it is possible to urge the designer to alter the design of structures having no conduction and suppress design mistakes.

The structures "c" and "h" are conducting only via the structures "d" through "g", which are smaller in size than the structures "c" and "h". In some frequencies, there is a fear that the impedance at high frequency will become high and consequently that the antenna propensity will also become high.

Figure 12:
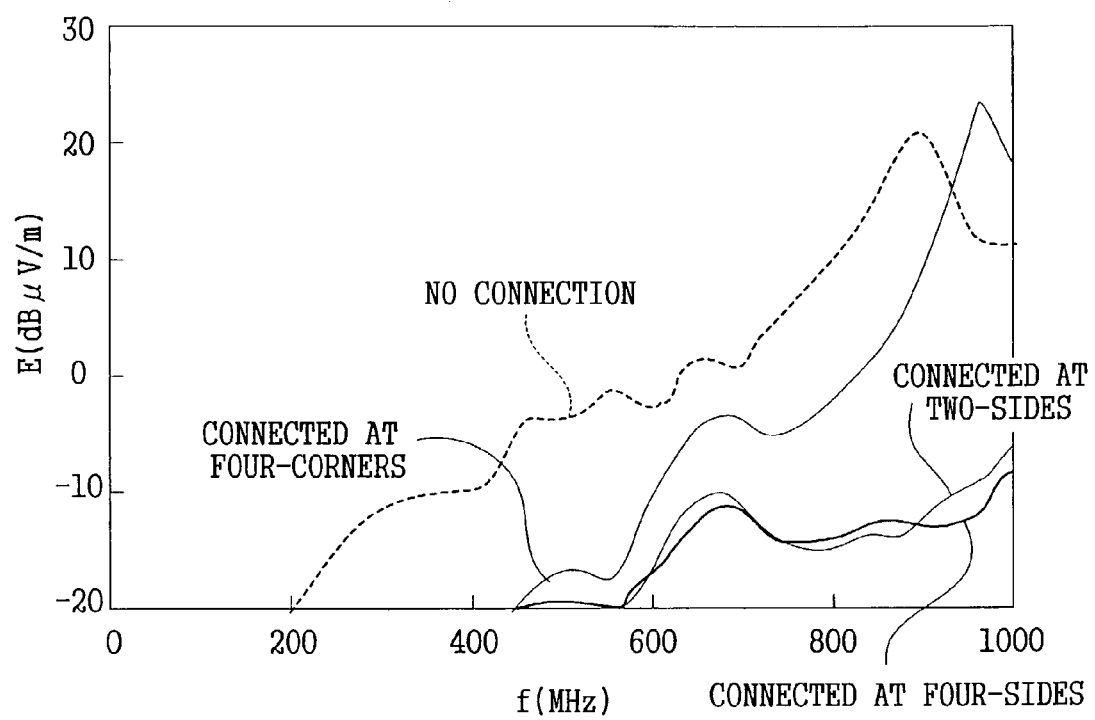
FIG. 12 is a diagram showing a simulation result of a relation between frequency and the level of electromagnetic wave radiation.

FIG. 12 shows a simulation result of electromagnetic wave radiation in the case where there is no conduction between the structure "c" and the structure "h", a simulation result of electromagnetic wave radiation in the case where there is conduction between the structure "c" and the structure "h" at four corners of the structure "h" via the structures "d" through "g" as shown in FIG. 9, a simulation result of electromagnetic wave radiation in the case where there is conduction between the structure "c" and the structure "h" at two of the four sides of the structure "h" via other conductive structures, and a simulation result of electromagnetic wave radiation in the case where there is conduction between the structure "c" and the structure "h" at all four sides of the structure "h" via other conductive structures. It will be appreciated from FIG. 12 that electromagnetic wave radiation is suppressed in the case where there is conduction between the structure "c" and the structure "h" at two of the four sides of the structure "h" via other conductive structures and in the case where there is conduction between the structure "c" and the structure "h" at all four sides of the structure "h" via other conductive structures as compared with the case where there is conduction between the structure "c" and the structure "h" at four corners of the structure "h" via the structures "d" through "g".

By displaying shapes and arrangements of respective structures and displaying contact routes as shown in FIGS. 8 and 9, it is possible to urge the designer to alter the design such as by increasing connection points between the structure "c" and the structure "h" and, thus, suppress design mistakes.

In this way, it is determined from conduction to the reference structure and the route length whether the antenna propensity is high or low, and the result of evaluation (decision) is output to the display or the like together with the shapes and arrangement of structures. Therefore, the designer can easily recognize structures having high antenna propensity, and take a countermeasure on the structure.

The case where a binary decision is made as to whether the antenna propensity is high or low has been described. However, the invention is not limited to this case. It is possible to derive an evaluation value A for evaluating the antenna propensity on the basis of the route length N and effect a multi-valued evaluation on the antenna propensity by using the evaluation value A. In this case, as the evaluation value A, for example, the route length N itself, or a value obtained by effecting a computation using a predetermined computation equation including the route length N can be used.

A processing routine executed by the shape determination section 22 will now be described with reference to a flow chart shown in FIG. 13.

Figure 13:
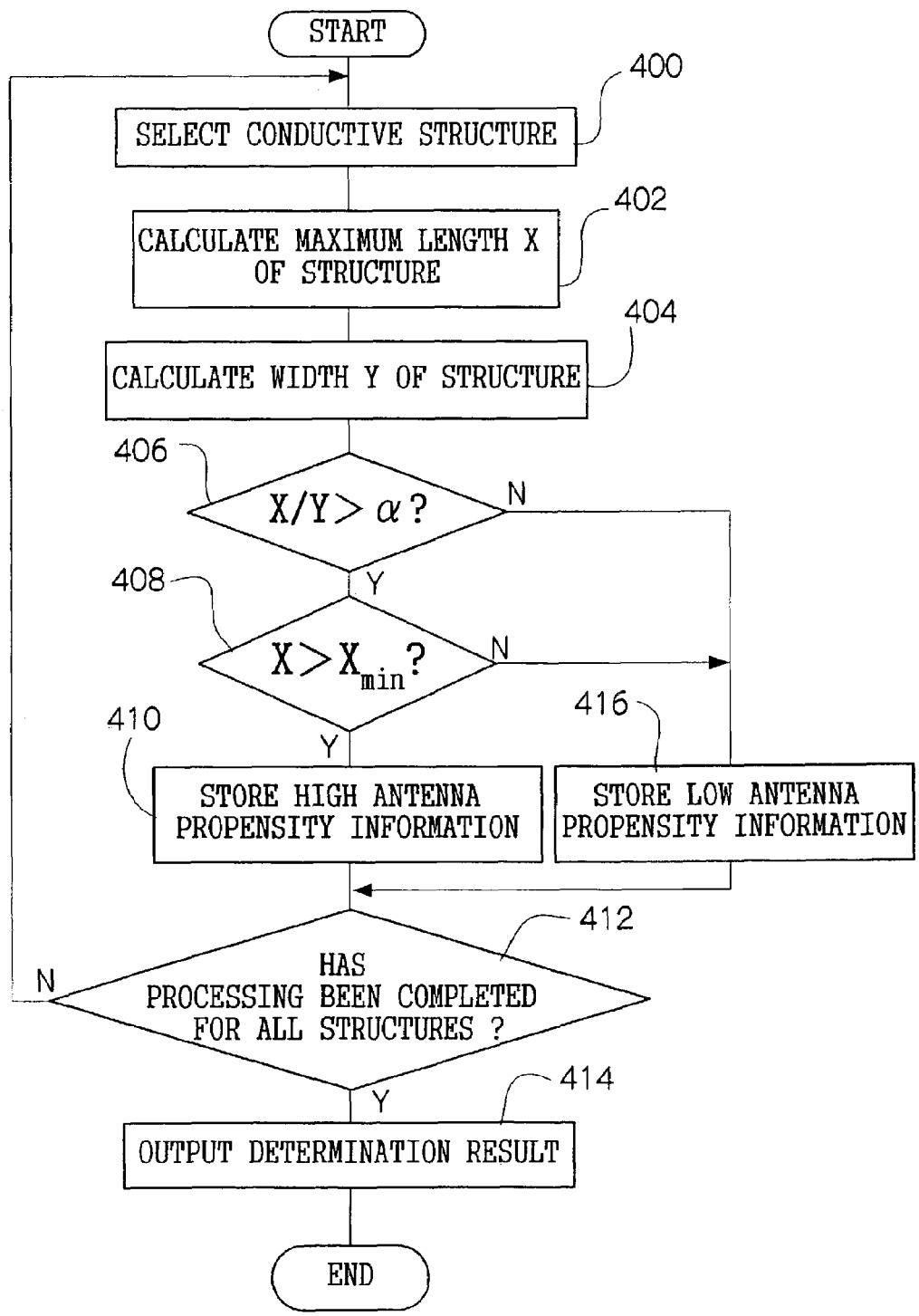
FIG. 13 is a flow chart of a processing routine executed in a shape determination section.

At step 400 shown in FIG. 13, the shape determination section 22 selects a conductive structure.

Figure 14:
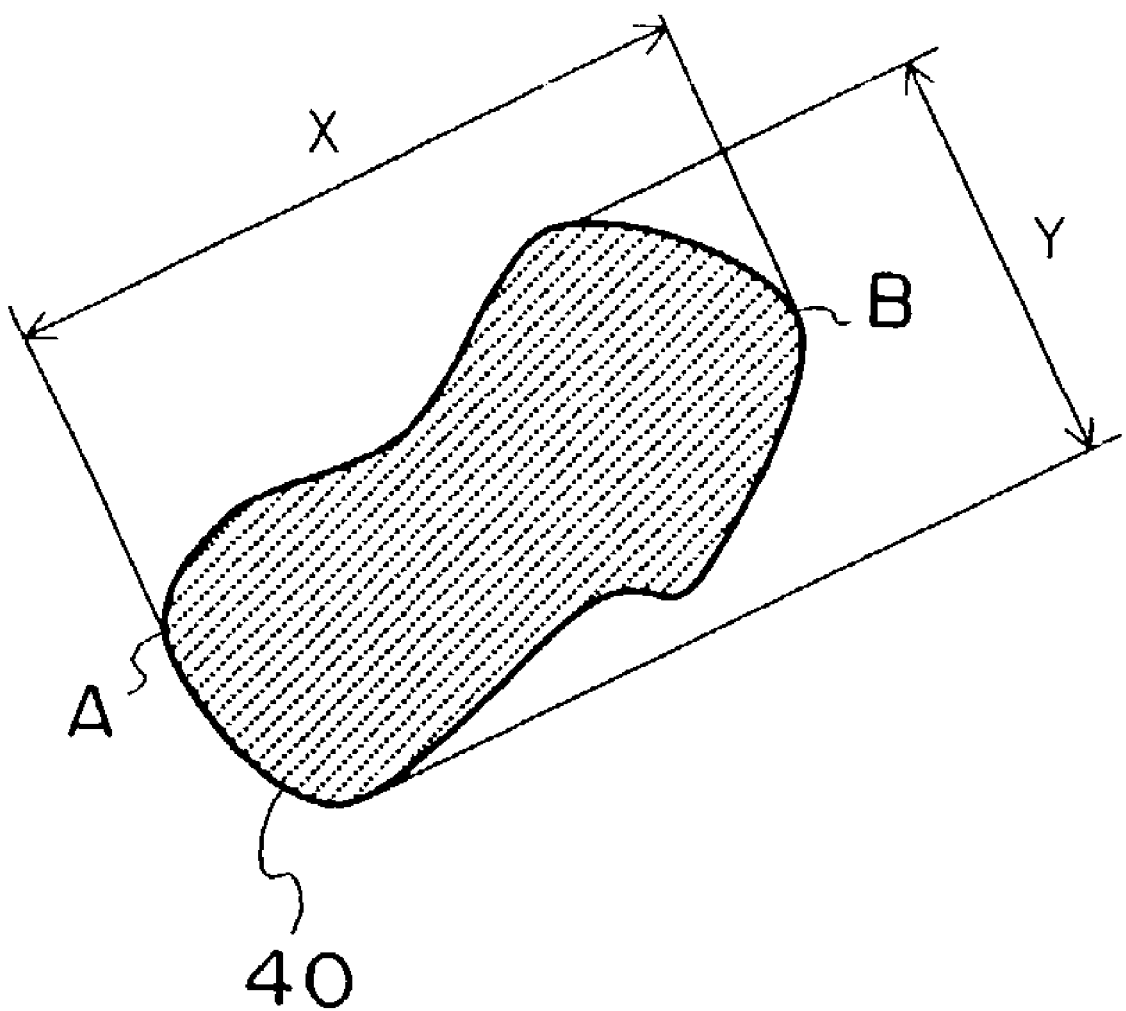
FIG. 14 is a concept diagram for explaining a shape of a structure.

At step 402, the maximum length X of the structure is calculated on the basis of coordinate data. For example, as shown in FIG. 14, the maximum length X is the longest distance between two points (between A and B in FIG. 14) among distances between two arbitrary points located on a peripheral portion of a structure 40.

At step 404, a width Y of the structure is calculated on the basis of coordinate data. For example, as shown in FIG. 14, the width Y is a maximum length of the structure 40 in a direction perpendicular to a straight line connecting the points A and B.

At step 406, it is determined whether X/Y, which is the ratio of the maximum length X to the width Y and represents the degree to which the structure is linear, is greater than a predetermined value $\alpha$. If, for example, the structure 40 has a slender shape and X/Y exceeds $\alpha$, then it can be determined that the degree of linearity is high and the antenna propensity becomes high. If X/Y is greater than the predetermined value $\alpha$, then the decision at step 406 is affirmative, and the sequence proceeds to step 408. On the other hand, if X/Y does not exceed the predetermined value $\alpha$, then the decision at step 406 is negative, and the sequence proceeds to step 416.

At step 408, it is determined whether the maximum length X is greater than a predetermined value Xmin. If a length of the structure 40 exceeds the predetermined value Xmin, then it can be determined that there is a possibility of the antenna possibility becoming high. If X is greater than the predetermined value Xmin, then the decision at step 408 is affirmative, and the sequence proceeds to step 410. On the other hand, if X does not exceed the predetermined value Xmin, then the decision at step 408 is negative, and the sequence proceeds to step 416.

At step 410, information indicating that the antenna propensity is high is stored in the memory 19 so as to be associated with the selected structure. At step 416, information indicating that the antenna propensity is low is stored in the memory 19 so as to be associated with the selected structure.

At step 412, it is determined whether the shape decision has been made for all structures. If the shape decision has been made for all structures, then the decision at step 412 is affirmative, and the sequence proceeds to step 414. On the other hand, if the shape decision has not been made for all structures, then the decision at step 412 is negative, and the sequence returns to step 400, where a structure that has not yet been selected is selected and processing similar to that described above is performed.

At step 414, the evaluation (decision) result stored in the memory 19, i.e., the structure and its antenna propensity are output by the output section 16. As a result, the designer can easily grasp structures, which have a linear shape, i.e., having such a shape that the antenna propensity is high and electromagnetic wave radiation is apt to occur. Therefore, the designer can easily take a countermeasure such as altering shapes of the structures, which have a high antenna propensity, and design mistakes can be prevented.

The case where a binary decision is made as to whether the antenna propensity is high or low has been described. However, the invention is not limited to this case. It is possible to derive an evaluation value B for evaluating the antenna propensity on the basis of the maximum length X and the width Y and effect a multi-valued evaluation on the antenna propensity by using the evaluation value B. In this case, as the evaluation value B, for example, X/Y representing the degree to which the structure is linear, or a value obtained by effecting a computation using a predetermined computation equation including X/Y can be used.

In the foregoing description, the decision on the shape is made on the basis of the maximum length X and the width Y. However, the shape decision is not limited thereto. A decision may be made as to whether the structure takes a shape of a dipole or a monopole, which is the shape of an antenna.

A processing routine executed by the distance determination section 24 will now be described with reference to a flow chart shown in FIG. 15.

Figure 15:
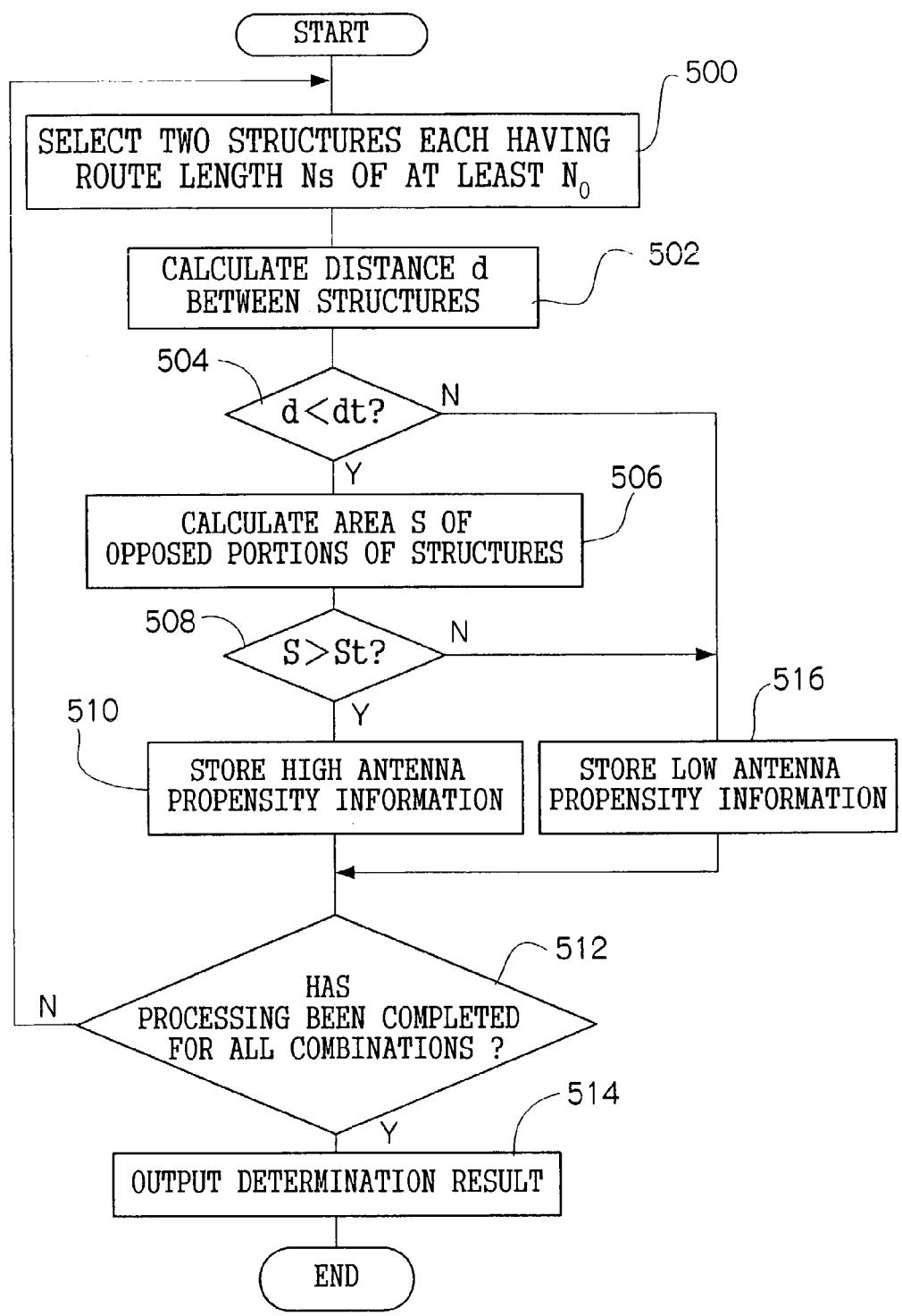
FIG. 15 is a flow chart of a processing routine executed in a distance determination section.
Figure 16:
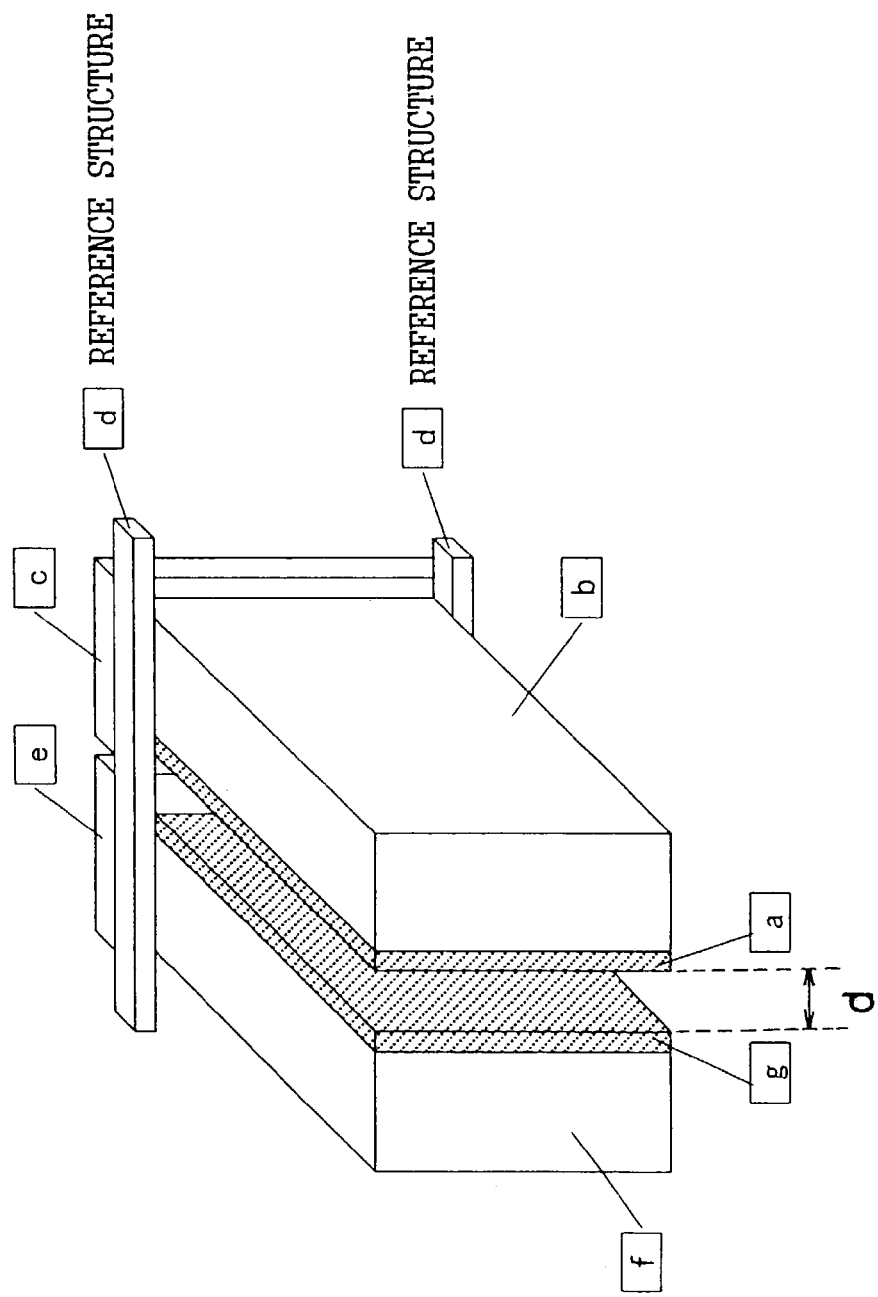
FIG. 16 is a diagram showing an arrangement of structures, which form an apparatus.

At step 500 shown in FIG. 15, the distance determination section 24 selects two structures, which have route length Ns that is at least a predetermined threshold $N_0$ (for example, 5) from among contact routes derived previously by the route determination section 30. The route length Ns is a route length between the selected structures. For example, in the case of an apparatus including structures "a" to "g" as shown in FIG. 16, the contact route becomes "a"-"b"-"c"-"d"-"e"-"f"-"g". A large number of structures are present between the structure "a" and the structure "g", and the route length Ns becomes long. In such a case, the structure "a" and the structure "g" are selected.

As shown in FIG. 16, even if a route length N from a reference structure "d" is short in the case where a distance d between the two structures "a" and "g" each having a long route length Ns is short and areas of opposing portions of the two structures "a" and "g" are large, there is a possibility of noise voltage occurring at high frequencies and there is a fear of antenna propensity increasing.

At step 502, therefore, the distance d between the two selected structures is calculated on the basis of coordinate data. In the case of the apparatus shown in FIG. 16, the distance "d" between the structure "a" and the structure "g" is calculated.

At step 504, it is determined whether the distance d is less than a predetermined value dt. The dt is such a value that it can be determined that the distance between the structures is too short and the antenna propensity becomes high when the distance is less than the value dt. If the distance d is less than the predetermined value dt, then the decision at step 504 is affirmative and the sequence proceeds to step 506. On the other hand, if the distance d is at least the predetermined value dt, then the decision at step 504 is negative and the sequence proceeds to step 516.

At step 506, an area S of opposing portions of the structures is calculated on the basis of the coordinate data.

At step 508, it is determined whether the area S of the opposing portions is greater than a predetermined value St. The predetermined value St is a value such that it can be determined that there is a possibility that the antenna propensity will become high if S exceeds the value St. If S is greater than the predetermined value St, then the decision at step 508 is affirmative and the sequence proceeds to step 510. On the other hand, if S does not exceed the predetermined value St, then the decision at step 508 is negative and the sequence proceeds to step 516.

At step 510, information indicating that the antenna propensity is high is stored in the memory 19 so as to be associated with the selected structure. At step 516, information indicating that the antenna propensity is low is stored in the memory 19 so as to be associated with the selected structure.

At step 512, it is determined whether the decision has been made for all combinations each having a long route length Ns between structures. If the decision has been made for all combinations, then the decision at step 512 is affirmative, and the sequence proceeds to step 514. On the other hand, if the decision has not been made for all combinations, then the decision at step 512 is negative, and the sequence returns to step 500, where a structure that has not yet been selected is selected and processing similar to that described above is effected.

At step 514, the evaluation (decision) result stored in the memory 19, i.e., the structure and its antenna propensity are output by the output section 16. As a result, the designer can easily grasp structure combinations, in which the antenna propensity is high and electromagnetic wave radiation is apt to occur, i.e., in which the route lengths are long and the distance between structures is short whereas the areas of opposing portions of the structures are large. Therefore, the designer can easily perform improvements such as interposing one or more structures between the structures each having a long route length Ns.

The case where a binary decision is made as to whether the antenna propensity is high or low has been described. However, the invention is not limited to this case. It is possible to derive an evaluation value C for evaluating the antenna propensity on the basis of the route length Ns, the distance d and the area S of opposing portions and effect a multi-valued evaluation on the antenna propensity by using the evaluation value C. In this case, as the evaluation value C, for example, a product of the route length Ns, the distance d and the area S of opposing portions, or a value obtained by effecting a computation using a predetermined computation equation including them can be used.

In the foregoing description, the result of decision made by the conduction determination section 20, the result of decision made by the shape determination section 22, and the result of decision made by the distance determination section 24 are output respectively independently. Alternatively, the antenna propensity may be evaluated by considering synthetically these decision results. For example, in the case where the evaluation values A of respective structures, the evaluation values B of respective structures and the evaluation values C of respective structures have been derived respectively by the conduction determination section 20, the shape determination section 22, and the distance determination section 24, an evaluation value D is calculated on the basis of the evaluation values A to C. If the evaluation value D is at least a predetermined threshold, the antenna propensity is determined to be high. If the evaluation value D is less than the predetermined threshold, the antenna propensity is determined to be low. The evaluation value D itself may also be output. By thus considering synthetically the results of decisions made by respective determination sections, a decision can be made with higher precision.

The processing at step 502 corresponds to a distance calculation unit of the invention. The processing at step 506 corresponds to an area calculation unit of the invention.

Figure 17:
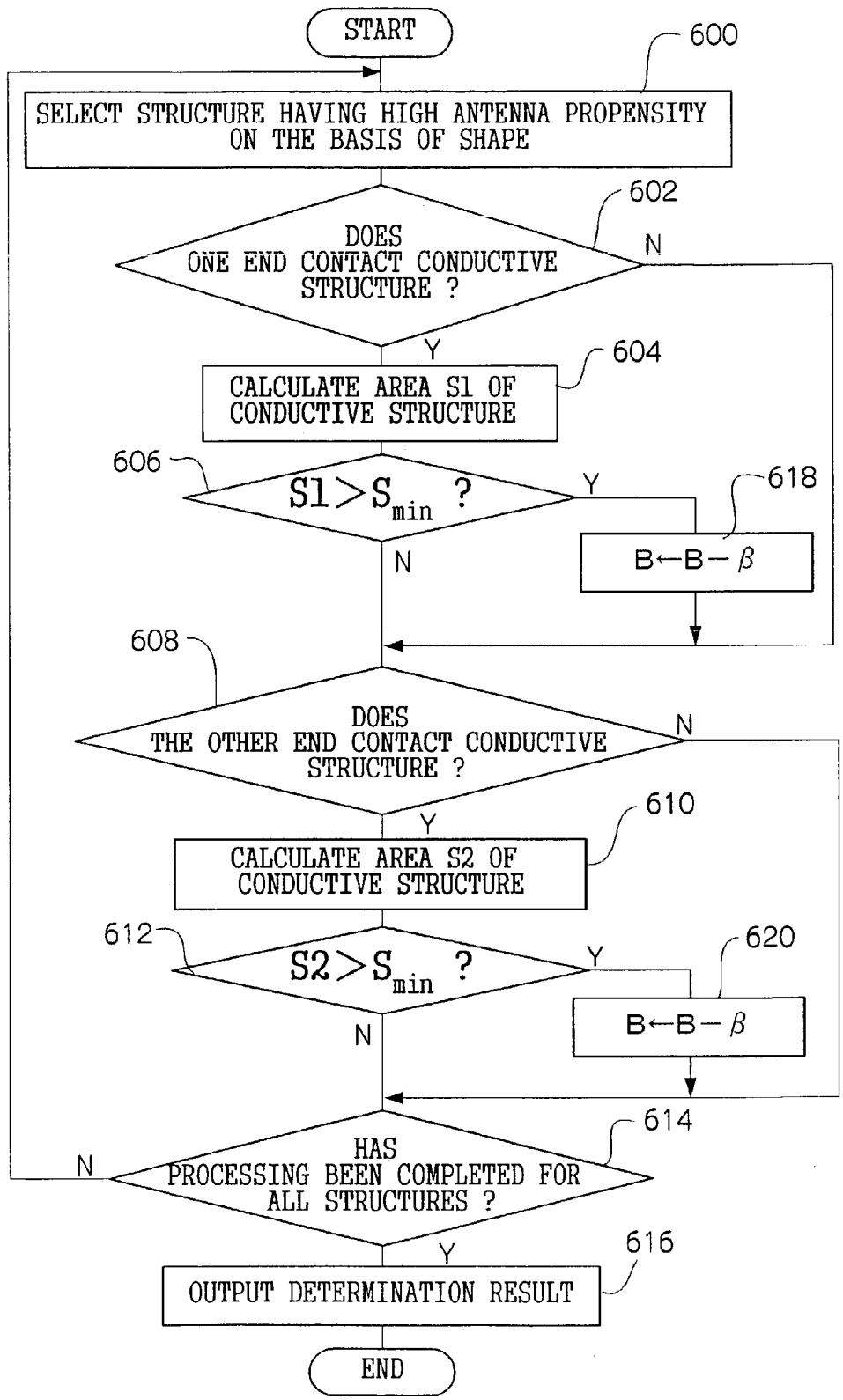
FIG. 17 is a flow chart of a processing routine executed in a contact determination section.

Even if the antenna propensity of a first structure is determined to be high by the shape determination section 22, the antenna propensity sometimes decreases when a second structure, which is in contact with the first structure, has a large area. Therefore, the case where the conduction determination section 20 calculates the evaluation value B for evaluating the antenna propensity and the contact determination section 28 adjusts the evaluation value B according to the area of a contacting structure will now be described with reference to a flow chart shown in FIG. 17.

Figure 18:
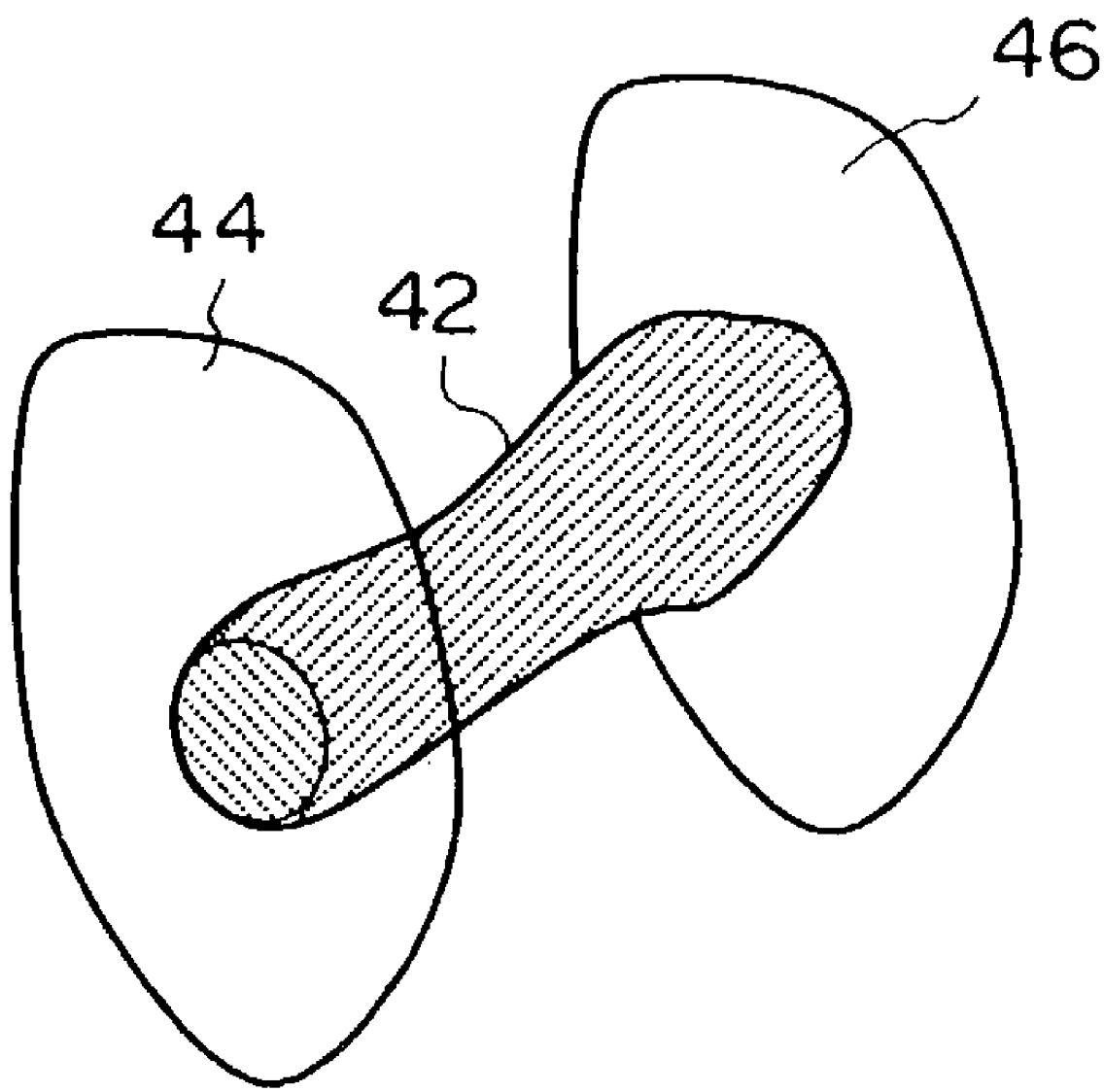
FIG. 18 is a concept diagram for explaining a contact property of a structure.

First, at step 600, a structure determined by the shape determination section 22 to have a high disposition, i.e., a structure 42 having a slender shape as shown in, for example, FIG. 18 is selected.

At a subsequent step 602, it is determined whether the selected structure is in contact with a conductive structure at one end of the selected structure. If, for example, one end of the structure 42 is in contact with a conductive structure 44 as shown in FIG. 18, then the decision at step 602 is affirmative and the sequence proceeds to step 604. On the other hand, if the structure 42 is not in contact with the conductive structure, then the decision at step 602 is negative and the sequence proceeds to step 608.

At step 604, an area S1 of a surface of the conductive structure 44 in contact with the structure 42 is calculated.

At step 606, it is determined whether the calculated area S1 is greater than a predetermined value Smin. If the area S1 does not exceed the predetermined value Smin, then the decision at step 606 is negative, and the sequence proceeds to step 608. On the other hand, if the area S1 is greater than the predetermined value Smin, then the decision at step 606 is affirmative, and the sequence proceeds to step 618. The predetermined value Smin is set to be a value such that the contact area is comparatively large and the antenna propensity can be decreased.

At step 618, a value obtained by subtracting a predetermined value $\beta$ (for example, a positive number smaller than B) from the evaluation value B (for example, a positive number) calculated by the shape determination section 22 is used as the evaluation value B. In this way, in the case where the contact area is comparatively large, the evaluation value B representing the antenna propensity is decreased by the predetermined value $\beta$.

At step 608, it is determined whether the selected structure is in contact with a conductive structure at the other end of the selected structure in the same way as the foregoing description. If, for example, the other end of the structure 42 is in contact with a conductive structure 46 as shown in FIG. 18, then the decision at step 608 is affirmative and the sequence proceeds to step 610. On the other hand, if the structure 42 is not in contact with a conductive structure, then the decision at step 608 is negative and the sequence proceeds to step 614.

At step 610, an area S2 of a surface of the conductive structure 46 in contact with the structure 42 is calculated.

At step 612, it is determined whether the calculated area S2 is greater than a predetermined value Smin. If the area S2 does not exceed the predetermined value Smin, then the decision at step 612 is negative, and the sequence proceeds to step 614. On the other hand, if the area S2 is greater than the predetermined value Smin, then the decision at step 612 is affirmative, and the sequence proceeds to step 620.

At step 620, a value obtained by subtracting a predetermined value $\beta$ from the evaluation value B is used as the evaluation value B. In the case where the structures 44 and 46, which have a comparatively large area, are in contact with the structure 42 at respective ends thereof as shown in FIG. 18, $2\beta$ is subtracted from the evaluation value B. In the case where structures are connected to the selected structure at respective ends thereof, the evaluation value B may be decreased by $2\beta$ or more because the antenna propensity can be decreased efficiently.

At step 616, it is determined whether the above described processing has been conducted for all structures determined by the shape determination section 22 to be high in antenna propensity. If the above described processing has been finished for all structures determined by the shape determination section 22 to be high in antenna propensity, then the decision at step 614 is affirmative, and the sequence proceeds to step 616. On the other hand, if the above described processing has not been finished for all structures determined by the shape determination section 22 to be high in antenna propensity, then the decision at step 614 is negative, and the sequence returns to step 600, where another structure that has been determined to be high in antenna propensity is selected and processing similar to that described above is effected.

At step 616, the evaluation (decision) result, for example, recalculated evaluation value B is output by the output section 16.

In the case where the structures 44 and 46 each having a comparatively large area are in contact with ends of the structure 42, the antenna propensity can be evaluated with higher precision because the evaluation value B is decreased.

Figure 19:
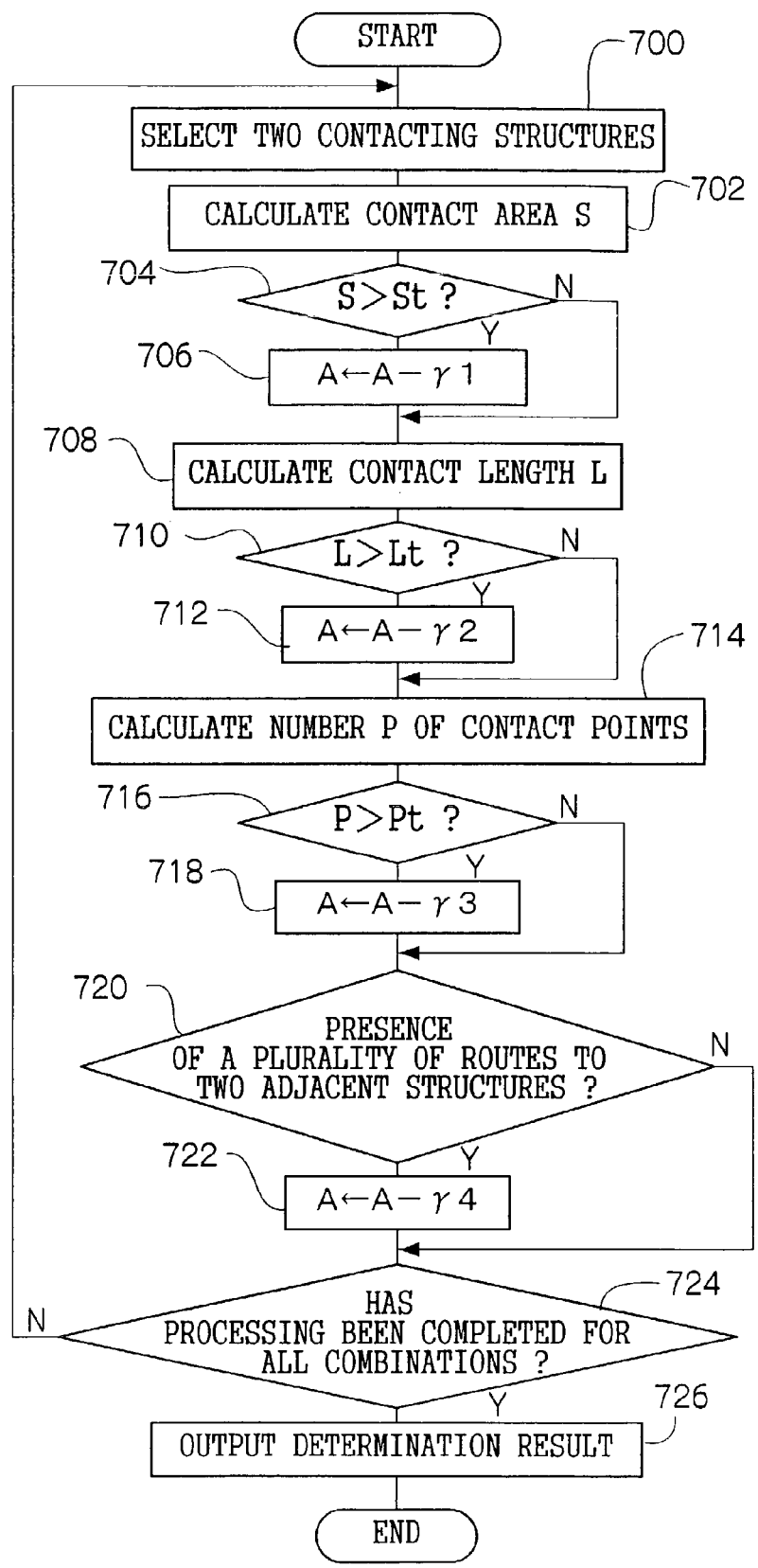
FIG. 19 is a flow chart of a processing routine executed in a contact determination section.
Figure 20:
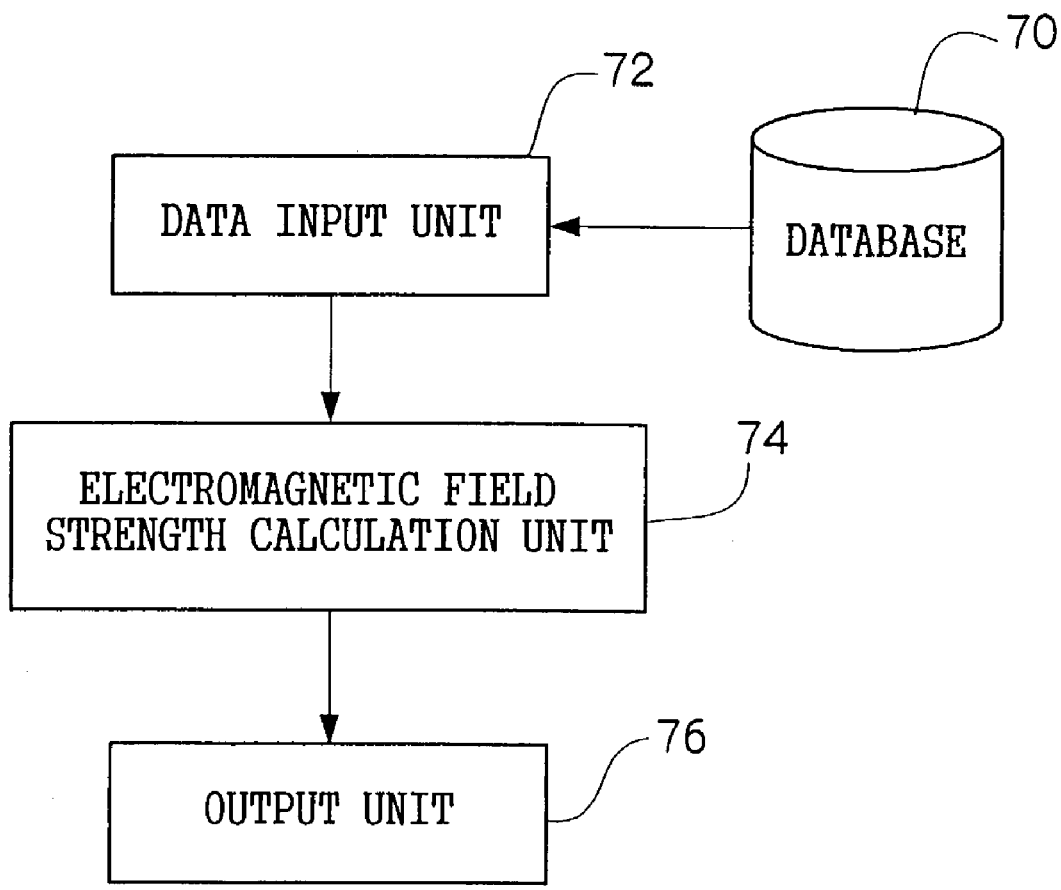
FIG. 20 is a schematic configuration diagram of a conventional design aid apparatus.

The antenna propensity also varies according to the area and length of contact portions and the number of contact points. Therefore, a case, which assumes that the conduction determination section 20 calculates the evaluation value A for evaluating the antenna propensity and the contact determination section 28 adjusts the evaluation value A by using the area and length of contact portions and the number of contact points, will now be described with reference to a flow chart shown in FIG. 19.

First, at step 700, two contacting structures are selected. At step 702, an area S of contact portions of the selected structures is calculated on the basis of coordinate data.

At step 704, it is determined whether the calculated area S is greater than a predetermined value St. If the area S is greater than the predetermined value St, then the decision at step 704 is affirmative and the sequence proceeds to step 706. On the other hand, if the area S is less than the predetermined value St, then the decision at step 704 is negative and the sequence proceeds to step 708. The predetermined value St is set to be a value such that the contact area is comparatively large and the antenna propensity can be decreased.

At step 706, a predetermined value $\gamma 1$ is subtracted from the evaluation value A. In this way, if the contacting area is comparatively large, then the contact is considered to be favorable and the antenna propensity is decreased.

At step 708, a length L of contact portions of the selected structures is calculated on the basis of coordinate data.

At step 710, it is determined whether the calculated length L is greater than a predetermined value Lt. If the length L is greater than the predetermined value Lt, then the decision at step 710 is affirmative and the sequence proceeds to step 712. On the other hand, if the length L is less than the predetermined value Lt, then the decision at step 710 is negative and the sequence proceeds to step 714. The predetermined value Lt is set to be a value such that the length of contact portions is comparatively long and the antenna propensity can be decreased.

At step 712, a predetermined value $\gamma 2$ is subtracted from the evaluation value A. In this way, if the length of the contact portions is comparatively long, then the contact is considered to be favorable and the antenna propensity is decreased.

At step 714, the number of points of the selected structures is calculated on the basis of coordinate data.

At step 716, it is determined whether the calculated number of contact points is greater than a predetermined value Pt. If the number P of contact points is greater than a predetermined value Pt, then the decision at step 716 is affirmative and the sequence proceeds to step 718. On the other hand, if the number P of contact points is less than the predetermined value Pt, then the decision at step 716 is negative and the sequence proceeds to step 720. The predetermined value Pt is set to be a value such that the number of contact points is comparatively large and the antenna propensity can be decreased.

At step 718, a predetermined value $\gamma 3$ is subtracted from the evaluation value A. In this way, if the number of contact points is comparatively large, then the contact is considered to be favorable and the antenna propensity is decreased.

At step 720, it is determined whether there are a plurality of routes to two adjacent structures. If there are a plurality of routes to the two adjacent structures, then the decision at step 720 is affirmative and the sequence proceeds to step 722. On the other hand, if there are no a plurality of routes to the two adjacent structures, then the decision at step 720 is negative and the sequence proceeds to step 724.

At step 722, a predetermined value $\gamma 4$ is subtracted from the evaluation value A. In this way, if there are a plurality of routes to the two adjacent structures, then the contact is considered to be favorable and the antenna propensity is decreased.

At step 724, it is determined whether the above described processing has been effected for all combinations of contacting structures. If the above described processing has been effected for all combinations of contacting structures, then the decision at step 724 is affirmative and the sequence proceeds to step 726. On the other hand, if the above described processing has not been effected for all combinations of contacting structures, then the decision at step 724 is negative and the sequence returns to step 700, where structures of another combination is selected and processing similar to that described above is performed.

The processing of steps 702, 708 and 714 corresponds to a detection unit of the invention.

In this way, the antenna propensity is adjusted according to the contact area and length and the number of contact points, and consequently, an evaluation with higher precision can be effected.

Thus, in the embodiment, presence of structures having a problem in the EMC can be clarified in a short time by using comparatively simple calculation even in an apparatus having complicated structures. It becomes possible to perform practical design aid considering the EMC on electric and electronic apparatuses.

Typically, the invention is implemented as a system including a computer apparatus, such as a personal computer, a memory, and input/output interface devices. The decision units and evaluation units of the invention can exist in the form of software programs existing on the memory, and can be loaded in a CPU of the computer apparatus and executed.

As heretofore described, the invention brings about an excellent effect that it becomes possible to determine whether electromagnetic wave radiation is apt to occur without increasing the calculation load even for an electric or electronic apparatus having a complicated structure.

What is claimed is:

1. A design aid apparatus to be used for designing an electronic device, which includes a plurality of structures and a previously specified reference conductive structure among the plurality of structures, the design aid apparatus comprising:

a storage unit for storing (a) information relating to shapes and arrangements of the respective structures and (b) conductivity information relating to conductivities of the respective structures;

an evaluation unit for evaluating an electromagnetic wave radiation property of the electronic device; and an output unit for outputting a result of the evaluation performed by the evaluation unit, wherein the evaluation unit includes:

a conductivity decision unit for determining a conductivity for each structure on the basis of the conductivity information and for excluding regions subjected to insulation process, a contact relation determination unit for determining, based on the information relating to shapes and arrangements of the respective structures, a contact relation, which expresses a state of one of electrical contact and electrical non-contact, between at least one conductive structure and another conductive structure, the at least one conductive structure and the other conductive structure being selected from among the plurality of structures and determined to have conductivity, and a route decision unit for determining, on the basis of the contact relation, a route length between the reference conductive structure and the at least one conductive structure, and the evaluation unit for evaluating the electromagnetic wave radiation property of the electronic device as an antenna propensity on the basis of the route length.

2. A design aid apparatus according to claim 1, wherein the information relating to shapes and arrangements comprises coordinate information.

3. A design aid apparatus according to claim 1, wherein the reference conductive structure comprises a structure electrically connected to a grounding terminal of the electronic device.

4. A design aid apparatus according to claim 1, wherein the conductivity information comprises information relating to at least one of a material, surface treatment, and conductivity, of the respective structures.

5. A design aid apparatus according to claim 1, wherein the route length is determined on the basis of a number of conductive structures that exist on a route between the reference conductive structure and the at least one conductive structure.

6. A design aid apparatus according to claim 1, wherein the route decision unit further calculates the route length between any two conductive structures on the basis of the contact relation.

7. A design aid apparatus according to claim 6, wherein the route length is determined on the basis of a number of conductive structures that exist on a route between two conductive structures, which have been determined to be in a contact relation.

8. A design aid apparatus according to claim 1, wherein the evaluation unit calculates a distance between a reference conductive structure and each of the structures having the route length that is at least a predetermined length, and when the distance is less than a predetermined value, the evaluation unit calculates an area of opposing portions of the two structures, and adjusts an evaluation result on the basis of the area.

9. A design aid apparatus according to claim 6, wherein the evaluation unit calculates a distance between any two structures, which have the route length that is at least a predetermined length, and when the distance is less than a predetermined value, the evaluation unit calculates an area of opposing portions of the two structures, and adjusts an evaluation result on the basis of the area.

10. A design aid apparatus according to claim 1, wherein the contact relation decision unit calculates, for two conductive structures that are in contact with each other, at least one of an area of a contact portion, a length of a contact portion, and a number of contact portions, and the evaluation unit adjusts the evaluation result on the basis of a result of said at least one calculation.

11. A design aid apparatus according to claim 1, wherein the evaluation unit further comprises a shape decision unit, the shape decision unit calculates a length of a conductive structure on the basis of coordinate information, and the evaluation unit adjusts the evaluation result on the basis of the length of the conductive structure.

12. A design aid apparatus according to claim 1, wherein the evaluation unit further comprises a shape decision unit, the shape decision unit for calculating a length and a width of a conductive structure on the basis of coordinate information, and the evaluation unit adjusts the evaluation result on the basis of a ratio between the length and the width of the conductive structure.

13. A design aid apparatus according to claim 11, wherein for a conductive structure having a length that is at least equal to a predetermined value and at least one end in contact with another conductive structure, the evaluation unit calculates an area of a contact portion at said at least one end, and adjusts the evaluation result on the basis of the area.

14. A method for evaluating an electromagnetic wave radiation property of an electronic device, the electronic device including a plurality of structures and a previously specified reference conductive structure among the plurality of structures, the evaluation method comprising the steps of:

providing (a) information relating to shapes and arrangements of the respective structures and (b) conductivity information relating to conductivities of respective structures;

excluding regions subjected to insulation process;

determining conductivities of the respective structures on the basis of the conductivity information;

determining, based on the information relating to shapes and arrangements of the respective structures, a contact relation, which expresses a state of one of electrical contact and electrical non-contact, between at least one conductive structure and another conductive structure, the at least one conductive structure and the other conductive structure being selected from among the plurality of structures and determined to have conductivity;

determining, based on the contact relation, a route length between the reference conductive structure and the at least one conductive structure;

evaluating the antenna propensity of the electronic device on the basis of the route length; and storing the antenna propensity.

15. An evaluation method according to claim 14, wherein the information relating to shapes and arrangements comprises coordinate information.

16. An evaluation method according to claim 14, wherein the reference conductive structure comprises a structure electrically connected to a grounding terminal of the electronic device.

17. An evaluation method according to claim 14, wherein the conductivity information comprises information relating to at least one of a material, surface treatment, and conductivity, of the respective structures.

18. An evaluation method according to claim 14, wherein the route length is determined on the basis of a number of conductive structures that exist on a route between the reference conductive structure and the at least one conductive structure.

19. An evaluation method according to claim 14, further comprising the step of calculating a length of a route between any two conductive structures on the basis of the contact relation.

20. An evaluation method according to claim 19, wherein the route length is determined on the basis of a number of conductive structures that exist on a route between two conductive structures, which have been determined to be in a contact relation.

* * * * *